(12) United States Patent
Jeon et al.

(10) Patent No.: US 9,989,994 B2
(45) Date of Patent: Jun. 5, 2018

(54) METHOD AND APPARATUS FOR EXECUTING A FUNCTION

(71) Applicant: Samsung Electronics Co., Ltd., Gyeonggi-do (KR)

(72) Inventors: Yong-Joon Jeon, Gyeonggi-do (KR); Geon-Soo Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 295 days.

(21) Appl. No.: 14/842,008

(22) Filed: Sep. 1, 2015

(65) Prior Publication Data
US 2016/0070407 A1 Mar. 10, 2016

(30) Foreign Application Priority Data

Sep. 4, 2014 (KR) .......................... 10-2014-0117859

(51) Int. Cl.
| | |
|---|---|
| *G06F 1/16* | (2006.01) |
| *H04B 1/3888* | (2015.01) |
| *H04M 1/725* | (2006.01) |
| *G06F 3/0488* | (2013.01) |
| *H04M 1/02* | (2006.01) |

(52) U.S. Cl.
CPC .......... *G06F 1/1626* (2013.01); *G06F 1/1632* (2013.01); *G06F 1/1677* (2013.01); *G06F 1/1692* (2013.01); *G06F 3/04883* (2013.01); *G06F 3/04886* (2013.01); *H04B 1/3888* (2013.01); *H04M 1/72575* (2013.01); *G06F 2200/1633* (2013.01); *G06F 2200/1634* (2013.01); *G06F 2203/04803* (2013.01); *H04M 1/0245* (2013.01); *H04M 2250/22* (2013.01)

(58) Field of Classification Search
CPC ..................................................... G06F 1/1626
USPC ........................................................ 345/173
See application file for complete search history.

(56) References Cited

U.S. PATENT DOCUMENTS

| | | | | |
|---|---|---|---|---|
| 5,584,054 | A * | 12/1996 | Tyneski ............. | H04M 1/0214 455/566 |
| 5,990,874 | A * | 11/1999 | Tsumura .............. | G06F 1/1626 345/100 |
| 6,415,138 | B2 * | 7/2002 | Sirola ................... | G06F 1/1626 345/173 |
| 9,342,172 | B2 * | 5/2016 | Choi ....................... | G06F 3/041 |
| 2004/0248621 | A1 * | 12/2004 | Schon ................... | G06F 1/1616 455/566 |
| 2010/0056222 | A1 * | 3/2010 | Choi .................... | H04M 1/0245 455/566 |
| 2013/0093220 | A1 * | 4/2013 | Pajic ....................... | A47C 7/70 297/163 |

(Continued)

FOREIGN PATENT DOCUMENTS

KR 10-2014-0112330 A 9/2014

*Primary Examiner* — Jason C Olson
(74) *Attorney, Agent, or Firm* — Cha & Reiter, LLC

(57) ABSTRACT

Provided is a method and apparatus enabling an electronic device to execute various functions when a flip cover is closed, in which if a screen is covered with or closed by a cover device for the electronic device, a covered area including at least a part of the remaining area of the screen except for an open area is activated, and a function corresponding to a user input inputted onto the covered area is executed.

19 Claims, 17 Drawing Sheets

(56) References Cited

U.S. PATENT DOCUMENTS

| | | | | |
|---|---|---|---|---|
| 2013/0113723 | A1* | 5/2013 | Chen | G06F 21/30 |
| | | | | 345/173 |
| 2013/0300679 | A1* | 11/2013 | Oh | A45C 11/00 |
| | | | | 345/173 |
| 2014/0128131 | A1* | 5/2014 | Sin | H04M 1/185 |
| | | | | 455/575.8 |
| 2014/0185206 | A1* | 7/2014 | Kim | H05K 5/0017 |
| | | | | 361/679.01 |
| 2014/0274214 | A1* | 9/2014 | Kim | H04M 1/0266 |
| | | | | 455/566 |
| 2014/0333552 | A1* | 11/2014 | Kang | G06F 3/03 |
| | | | | 345/173 |
| 2015/0105128 | A1* | 4/2015 | Huang | H04B 1/3888 |
| | | | | 455/575.8 |
| 2015/0222743 | A1* | 8/2015 | Lee | H04M 1/72577 |
| | | | | 455/566 |
| 2015/0229754 | A1* | 8/2015 | Won | G06F 1/165 |
| | | | | 455/575.8 |
| 2015/0268752 | A1* | 9/2015 | Ku | G06F 1/1626 |
| | | | | 345/173 |
| 2015/0311940 | A1* | 10/2015 | Lee | H04B 1/3888 |
| | | | | 455/575.8 |
| 2015/0323963 | A1* | 11/2015 | Tokutake | G06F 3/0416 |
| | | | | 345/173 |
| 2015/0346779 | A1* | 12/2015 | Chae | G06F 1/1677 |
| | | | | 715/773 |

\* cited by examiner

METHOD AND APPARATUS FOR EXECUTING A FUNCTION

CLAIM OF PRIORITY

This application claims priority under 35 U.S.C. § 119(a) to Korean Patent Application Serial number 10-2014-0117859, which was filed on Sep. 4, 2014 in the Korean Intellectual Property Office, the entire disclosure of which is hereby incorporated by reference.

TECHNICAL FIELD

The present disclosure relates to electronic devices, and more particularly to a method and apparatus for executing a function.

BACKGROUND

Electronic devices such as smartphones, Personal Computers (PCs), tablet devices, and the like provide a variety of useful functions to users through various applications. The electronic devices have evolved to allow users to use information in various forms together with a voice communication function, by providing various functions. Also, development and use of accessory devices connectable to the electronic devices have also been diversified. The accessory devices may include, for example, an electronic pen capable of inputting a touch onto a touchscreen, a cover for protecting a touchscreen of an electronic device (for example, a flip cover, a sliding cover, a folder cover, and so forth), and the like.

When a cover having a projection portion is coupled with the electronic device, a standby screen or an execution screen of an application may be displayed on a partial area of a whole screen of a touchscreen of the electronic device, which corresponds to the window of the cover. The user may also input a user gesture, such as a touch input or a hovering input, onto the partial area.

The projection portion of the accessory device such as the cover (for example, a flip cover) uses a partial area of the whole screen, thus having limited executable functions. Moreover, due to a small size of the partial area, the user often experiences inconvenience in manipulating the electronic device on the partial area. Furthermore, to use various functions, the user needs to open the cover for direct input onto the screen of the electronic device.

The above information is presented as background information only to assist with an understanding of the present disclosure. No assertion is made, as to whether any of the above might be applicable as prior art with regard to the present disclosure.

SUMMARY

According to one aspect of the disclosure, a method is provided for executing a function in an electronic device, the method comprising: activating a covered area of a screen, when the screen is covered with a cover; and executing a function corresponding to a user input inputted onto the covered area while the cover is closed.

According to another aspect of the disclosure, an electronic device is provided comprising: a display panel; and a controller configured to control operations of activating a covered area of a screen when the screen is covered with a cover, and executing a function based on a user input inputted onto the covered area while the cover is closed.

According to yet another aspect of the disclosure, a non-transitory computer-readable recording medium including processor-executable instructions which when executed by a processor cause the processor to perform a process comprising the steps of: activating a covered area of a screen when the screen is covered with a cover; and executing a function corresponding to a user input inputted onto the covered area.

BRIEF DESCRIPTION OF THE DRAWINGS

The above and other aspects, features and advantages of embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
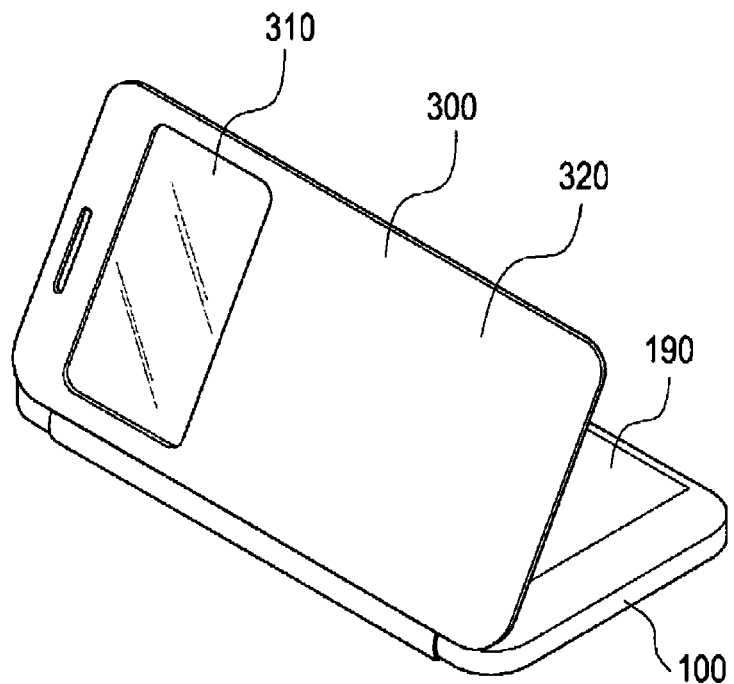
FIG. 1A and FIG. 1B are diagrams of an example of an electronic device according to embodiments of the present disclosure.

Exemplary embodiments of the present disclosure will be described herein below with reference to the accompanying drawings. For the purposes of clarity and simplicity, detailed descriptions of well-known functions or configurations will be omitted as they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

Although the present disclosure can be modified variously and have several embodiments, specific example embodiments are illustrated in the accompanying drawings and will be mainly described in the specification. However, the scope of the present disclosure is not limited to the specific embodiments and should be construed as including all the changes, equivalents, and substitutions included in the spirit and scope of the present disclosure.

Singular expressions such as "unless explicitly indicated otherwise" or "the" may be understood as including plural expressions. For example, "component surface" may include one or more component surfaces.

Although ordinal numbers such as "first", "second", and so forth will be used to describe various components, those components are not limited by the terms. For example, the terms do not limit the order and/or importance of the components. The terms are used for distinguishing one component from another component. For example, a first user device and a second user device are both user devices, and indicate different user devices. Also, a first component may be referred to as a second component and likewise, a second component may also be referred to as a first component, without departing from the teaching of the present disclosure.

Terms used in various embodiments of the present disclosure are intended to describe an exemplary embodiment, rather than to limit the various embodiments of the present disclosure. As used herein, the singular forms are intended to include the plural forms as well, unless the context clearly indicates otherwise. Terms "include" or "may include" used in various embodiments of the present disclosure indicate an existence of disclosed function, operation, or element, but do not limit an existence of one or more other functions, operations, or elements. Terms "include" or "has" used in the present disclosure should be understood that they are intended to indicate an existence of feature, number, step, operation, element, item or any combination thereof, disclosed in the specification, but should not be understood that they are intended to previously exclude an existence of one or more other features, numbers, steps, operations, elements, or any combination thereof or possibility of adding those things.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the specification with the context of the relevant art as understood by the artisan at the time of disclosure and will not be interpreted in an idealized or overly formal sense unless expressly so defined herein.

An electronic device according to various embodiments of the present disclosure may include a display device. For example, the electronic device may be one of or a combination of one or more of various devices, such as a smartphone, a tablet Personal Computer (PC), a mobile phone, a video phone, an electronic book (e-book) reader, a netbook computer, a Personal Digital Assistant (PDA), a Portable Multimedia Player (PMP), an MP3 player, a mobile healthcare appliance, a camera, a wearable device, an electronic clock, a wrist watch, an artificial intelligence robot, a television (TV), a Digital Video Disk (DVD) player, an audio system, a navigation system, a Global Positioning System (GPS) receiver, an Event Data Recorder (EDR), a Flight Data Recorder (FDR), an electronic dictionary, a vehicle infotainment system, a camcorder, a game console, a Head-Mounted Display (HMD), a flat panel display device, an electronic frame, an electronic album, and so forth. It would be obvious to those of ordinary skill in the art that an electronic device according to various embodiments of the present disclosure is not limited to the foregoing devices.

According to various embodiments of the present disclosure, an electronic device may be coupled with a cover. The cover is a device for protecting a touchscreen, and may include a window for securing visibility of an object displayed on a display device, for example, a touchscreen, of the electronic device. The cover may be classified into a flip type, a folder type, and a sliding type, depending on an external form of the cover or a manner in which the cover is coupled with the electronic device.

According to various embodiments of the present disclosure, when the electronic device is coupled with the cover and a touchscreen of the electronic device is covered with or closed by the cover (that is, a covered state), then the electronic device may activate an open area of the touchscreen, which corresponds to the window of the cover. On the open area, information or various objects may be displayed. Upon occurrence of an activation event, the electronic device may activate a covered area of the touchscreen. Thereafter, the electronic device executes a function corresponding to a user gesture input through the covered area. The electronic device may display a result screen of function execution corresponding to the user gesture on the open area.

Figure 1B:
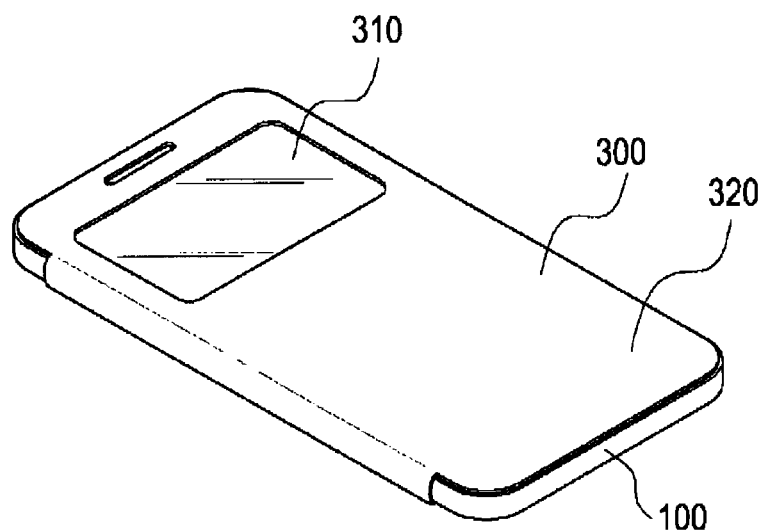

FIGS. 1A and 1B are diagrams of an example of an electronic device, according to embodiments of the present disclosure. In FIG. 1A, according to an exemplary embodiment of the present disclosure, a flip-type cover 300 coupled to an electronic device 100 is opened. In FIG. 1B, according to an exemplary embodiment of the present disclosure, the flip-type cover 300 is closed and covers a touchscreen 190 of the electronic device 100. Referring to FIGS. 1A and 1B, the cover 300 includes a window 310 and a portion 320. The window 310 may be formed of a transparent (or translucent) film or may by perforating the cover 300 to guarantee visibility of the portion of the touchscreen 190 of the electronic device 100 that is positioned under the window 310. The portion 320 may be formed of any material that at least partially blocks light generated by the touchscreen 190, such as a transparent material, a translucent material, a material that blocks the light completely, etc. In some implementations, the portion 320 may be made of a material that has a lower light transmissivity than the window 310. While the window 310 is formed in a position corresponding to an upper portion of the electronic device 100 according to an exemplary embodiment of the present disclosure, it may also be formed in various positions of the cover 300 according to other embodiments. The cover 300 may be of any suitable type, such as a folder type or a sliding type.

Figure 2:
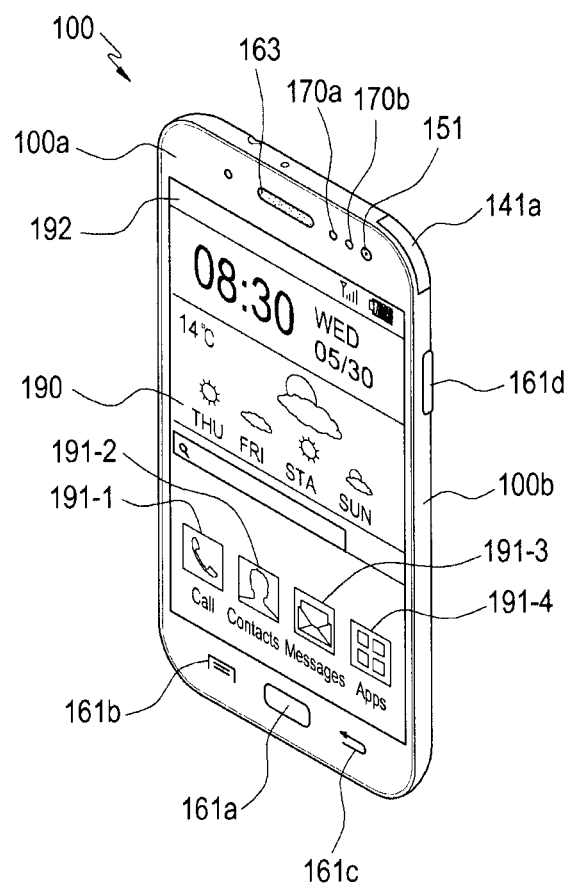
FIG. 2 is an exterior perspective view of an example of an electronic device according to embodiments of the present disclosure.

With reference to FIG. 2, an exterior of the electronic device 100 to which the present disclosure is applied will be described. FIG. 2 is a front perspective view of the electronic device 100 according to an exemplary embodiment of the present disclosure. Referring to FIG. 2, a touchscreen 190 may be disposed in the center of a front surface 100a of the electronic device 100.

The touchscreen 190 may be formed large to occupy the most part of the front surface 100a of the electronic device 100. In FIG. 2, an example is illustrated in which a main home screen is displayed on the touchscreen 190. The main home screen is an initial screen displayed on the touchscreen 190 when the electronic device 100 is powered on. When the electronic device 100 has different home screens of several pages, the main home screen may be the first home screen among the home screens of the several pages. Shortcut icons 191-1, 191-2, and 191-3 for executing frequently used applications, a main menu change key 191-4, time, weather, and so forth may be displayed on the home screen. If the user selects the main menu change key 191-4, a menu screen is displayed on the touchscreen 190. A status bar 192 indicating a state of the electronic device 100, such as a battery charge state, a strength of a received signal, and a current time, may be formed in an upper portion of the touchscreen 190.

In a lower portion of the touchscreen 190, a home button 161a, a menu button 161b, and a back button 161c may be disposed.

The home button 161a is intended to display the main home screen on the touchscreen 190. For example, when any home screen, which is different from the main home screen, or a menu screen is displayed on the touchscreen 190, the main home screen may be displayed on the touchscreen 190 upon selection of the home button 161a. If the home button 161a is selected during execution of applications on the touchscreen 190, the main home screen illustrated in FIG. 2 may be displayed on the touchscreen 190. The home button 161a may be used to display recently used applications or a task manager on the touchscreen 190.

The menu button 161b provides a connection menu which may be displayed on the touchscreen 190. The connection menu may include, for example, a widget add menu, a background change menu, a search menu, an edit menu, and an environment setting menu.

The back button 161c may be used to display a screen which was executed immediately before the currently executed screen or to terminate the most recently used application.

The first camera 151, an illumination sensor 170a, and a proximity sensor 170b may be disposed on an edge of the front surface 100a of the electronic device 100. The second camera 152, a flash, and a speaker 163 may be disposed on a rear surface 100c of the electronic device 100.

A power/reset button 160a, a volume button 161b, a terrestrial DMB antenna 141a for broadcasting reception, and one or more microphones 162 may be disposed on a lateral surface 100b of the electronic device 100. The DMB antenna 141a may be fixed to or removable from the electronic device 100.

The structure of the electronic device 100 described above is illustrated in FIG. 3.

Figure 3:
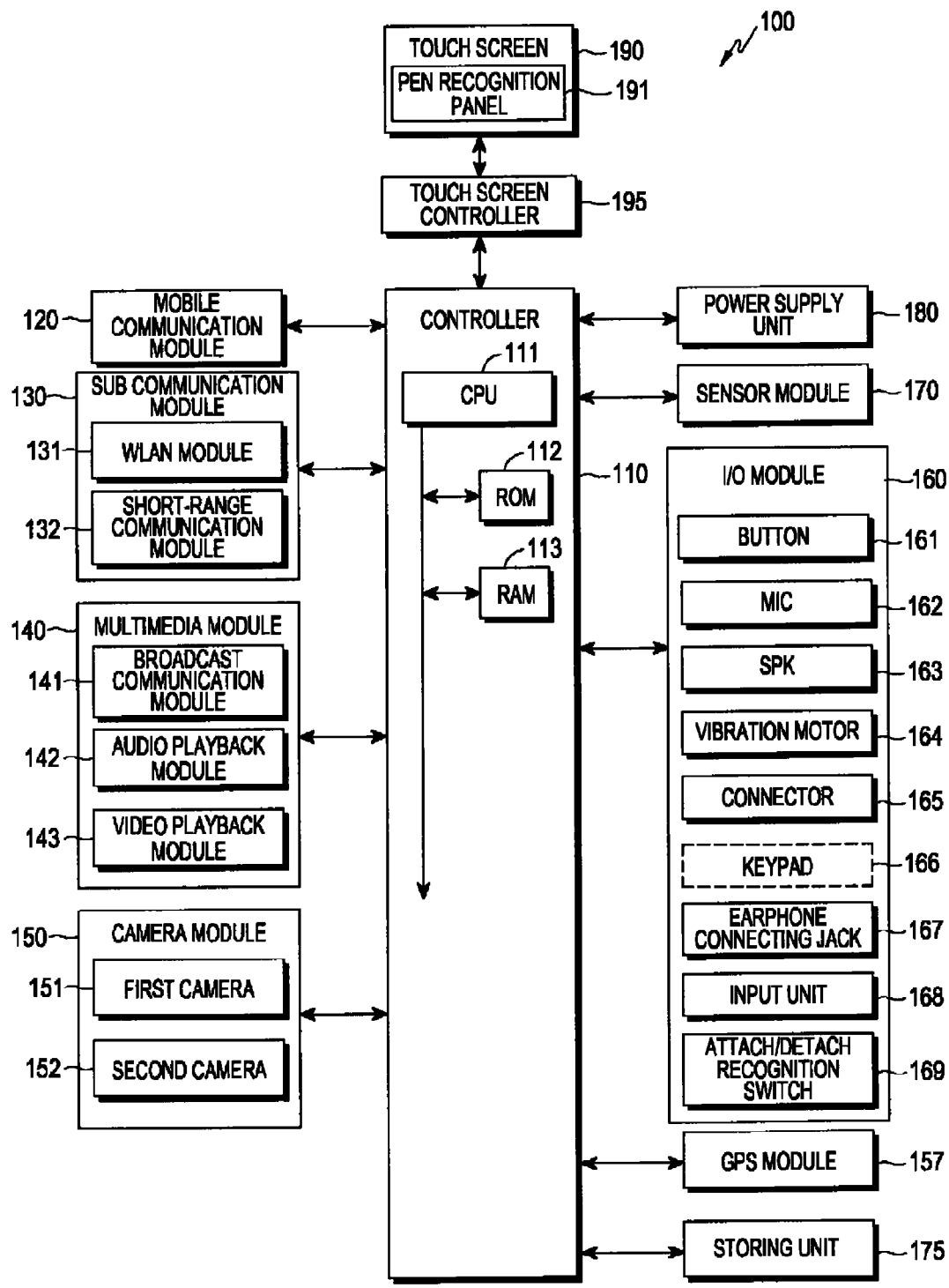
FIG. 3 is a block diagram of an example of an electronic device according to embodiments of the present disclosure.

FIG. 3 is a block diagram of the electronic device 100 according to an exemplary embodiment of the present disclosure. Referring to FIG. 3, the electronic device 100 may include at least one touchscreen 190 and at least one touchscreen controller 195. The electronic device 100 may also include the controller 110, a mobile communication module 120, a sub communication module 130, a multimedia module 140, a camera module 150, a Global Positioning System (GPS) module 157, an input/output module 160, a sensor module 170, a storing unit 175, and a power supply unit 180.

The sub communication module 130 may include at least one of a Wireless Local Area Network (WLAN) module 131 and a short-range communication module 132. The multimedia module 140 may include at least one of a broadcast communication module 141, an audio playback module 142, and a video playback module 143. The camera module 150 may include at least one of a first camera 151 and a second camera 152. The camera module 150 of the electronic 100 according to the present disclosure may also include the flash for providing a light source for photographing. The input/output module 160 may include at least one of buttons 161, a microphone 162, a speaker 163, a vibration motor 164, a connector 165, and a keypad 166.

The controller 110 may include any suitable type of processing circuitry, such as a Central Processing Unit (CPU) 111, a Read Only Memory (ROM) 112 in which a control program for controlling the electronic device 100 is stored, and a Random Access Memory (RAM) 113 which memorizes a signal or data input from the electronic device 100 or is used as a memory region for a task performed in the electronic device 100. The CPU 111 may include a single core, a dual core, a triple core, or a quad core processor. The CPU 111, the ROM 112, and the RAM 113 may be interconnected through an internal bus.

The controller 110 may control the communication module 120, the sub communication module 130, the multimedia module 140, the camera module 150, the GPS module 157, the input/output module 160, the sensor module 170, the storing unit 175, the power supply unit 180, the touchscreen 190, and the touchscreen controller 195. The controller 110 detects a user gesture generated on the touchscreen 190 corresponding to a gesture of a touchable input unit 168, such as an electronic pen, when a plurality of objects are displayed on the touchscreen 190. According to an embodiment of the present disclosure, a user input corresponding to the gesture of the input unit 168 may include a touch input touching the touchscreen 190 and a hovering input.

The controller 110 determines whether hovering is sensed as the touchable input unit 168, such as the electronic pen, approaches any one of the plurality of objects displayed on the touchscreen 190, and identifies a position where hovering occurs or an object corresponding to the position. The controller 110 may also sense a height from the electronic device 100 to an input unit and a hovering input corresponding to the height. The hovering input may include at least one of pressing of a button, tapping of an input unit, faster moving of the input unit than a predetermined speed, and touching of an object.

The mobile communication module 120 may facilitate the connection between the electronic device 100 and an external device through mobile communication by using one or more antennas (not illustrated) under control of the controller 110. The mobile communication module 120 transmits/receives a wireless signal for a voice call, a video call, a text message (Short Messaging Service: SMS), and/or a multimedia message (Multi Media Service: MMS) with a cellular phone (not illustrated), a smartphone (not illustrated), a tablet PC, or another electronic device (not illustrated) which has a phone number input into the electronic device 100.

The sub communication module 130 may include at least one of the WLAN module 131 and the short-range communication module 132. For example, the sub communication module 130 may include either the WLAN module 131 or the short-range communication module 132, or both.

The WLAN module 131 may be connected to the Internet in a place where a wireless AP (not illustrated) is installed, under control of the controller 110. The WLAN module 131 supports the wireless LAN standard IEEE802.11x of the Institute of Electrical and Electronics Engineers (IEEE). The short-range communication module 132 may wirelessly perform short-range communication between the electronic device 100 and an external electronic device under control of the controller 110. The short-range communication may include Bluetooth, infrared data association (IrDA), Wireless Fidelity (Wi-Fi)-Direct communication, NFC communication, or the like.

Through at least one of the sub communication module 130 and the WLAN module 131, the controller 110 may transmit a control signal for vibration to the input unit.

The electronic device 100, depending on its capability, may include at least one of the mobile communication module 120, the WLAN module 131, and the short-range communication module 132. The electronic device 100, depending on its capability, may include a combination of the mobile communication module 120, the WLAN module 131, and the short-range communication module 132. In the present disclosure, at least one of or a combination of the mobile communication module 120, the WLAN module 131, and the short-range communication module 132 is referred to as a transmission/reception unit, which does not limit the scope of the present disclosure.

The multimedia module 140 may include the broadcast communication module 141, the audio playback module 142, or the video playback module 143. The broadcast communication module 141 receives a broadcast signal (for example, a TV broadcast signal, a radio broadcast signal, or a data broadcast signal) and broadcast additional information (for example, Electric Program Guide (EPG) or Electric Service Guide (ESG)) transmitted from a broadcasting station (not illustrated) via a broadcast communication antenna (not illustrated) under control of the controller 110. The audio playback module 142 may play a digital audio file (for example, a file having a file extension such as 'mp3', 'wma', 'ogg', or 'wav') stored in the storing unit 175 or received under control of the controller 110. The video playback module 143 plays a digital video file (for example, a file having a file extension such as 'mpeg', 'mpg', 'mp4', 'avi', 'mov', or 'mkv') stored or received under control of the controller 110. The video playback module 143 also plays a digital audio file.

The multimedia module 140 includes the audio playback module 142 and the video playback module 143, except for the broadcast communication module 141. The audio playback module 142 or the video playback module 143 of the multimedia module 140 may be integrated into the controller 110.

The camera module 150 includes at least one of the first camera 151 and the second camera 152 which capture a still image or a video under control of the controller 110. The first camera 151 may be positioned on the front surface of the electronic device 100, and the second camera 152 may be positioned on the rear surface of the electronic device 100. In another embodiment, the first camera 151 and the second camera 152 may be positioned adjacent to each other (for example, a space between the first camera 151 and the second camera 152 is greater than 1 cm and less than 8 cm) to capture a three-dimensional (3D) still image or a 3D moving image.

The first camera 151 and the second camera 152 each may include a lens system, an image sensor, and so forth. The first camera 151 and the second camera 152 convert an optical signal (input or captured) through the lens systems into an electric image signal and output the electric image signal to the controller 110. The user may capture a moving image or a still image through the first camera 151 and the second camera 152.

The GPS module 157 receives electric waves from a plurality of GPS satellites (not illustrated) in the Earth's orbit, and calculates a location of the electronic device 100 by using a time of arrival from the GPS satellite (not illustrated) to the electronic device 100.

The input/output module 160 may include the at least one button 161, the microphone 162, the speaker 163, the vibration motor 164, the connector 165, the keypad 166, the earphone connecting jack 167, and the input unit 168. However, it should be noted that the input/output module 160 is not limited to those examples, and a cursor control such as, for example, a mouse, a track ball, a joystick, or a cursor direction key may be provided to control movement of a cursor on the touchscreen 190.

The buttons 161 may be formed on at least one of a front surface, a side surface, and a rear surface of a housing (or case) of the electronic device 100, and may include at least one of a power/lock button, a volume button, a menu button, a home button, a back button, and a search button.

The microphone 162 receives voice or sound and generates a corresponding electric signal under control of the controller 110. The speaker 163 outputs sound corresponding to various signals (for example, a wireless signal, a broadcast signal, a digital audio file, a digital video file, picture taking, or the like) of the mobile communication module 120, the sub communication module 130, the multimedia module 140, or the camera module 150 and sound corresponding to a control signal provided to the input unit through Bluetooth to the outside of the electronic device 100, under control of the controller 110. The sound corresponding to the control signal may include sound corresponding to activation of a vibration element 520 of the input device 168, sound having a volume varying with the strength of vibration, and sound corresponding to deactivation of the vibration element 520. The volume of the sound may be controlled according to the strength of vibration of the vibration element 520 of the input unit 168, or the sound may be output through the speaker 163 of the electronic device 100 and/or a speaker (not illustrated) provided in the input unit 168 simultaneously with or a predetermined time (for example, 10 ms) before/after activation of the vibration element 520. The sound may be terminated simultaneously with or a predetermined time (for example, 10 ms) before/after deactivation of the vibration element 520. The speaker 163 outputs sound (for example, button manipulation sound corresponding to a phone call or a ring back tone) corresponding to a function executed by the electronic device 100, and one or more of the speaker 163 may be formed in predetermined areas of a housing of the electronic device 100.

The vibration motor 164 converts an electric signal into mechanical vibration under control of the controller 110. For example, in the electronic device 100, in a vibration mode, if a voice call or a video call from another device (not illustrated) is received, the vibration motor 164 operates. One or more of the vibration motor 164 may be disposed in the housing of the electronic device 100.

The connector 165 may be used as an interface for connecting the electronic device 100 with an external device (not illustrated) or a power source (not illustrated). Under control of the controller 110, data stored in the storing unit 175 of the electronic device 100 may be transmitted to an external electronic device or data may be received from the external electronic device through a wired cable connected to the connector 165. The electronic device 100 receives power from the power source through the wired cable connected to the connector 165 or may charge a battery (not illustrated) by using the power source.

The keypad 166 receives key input from the user for control of the electronic device 100. The keypad 166 includes a physical keypad (not illustrated) formed in the electronic device 100 or a virtual keypad (not illustrated) displayed on the touchscreen 190. The physical keypad (not illustrated) formed in the electronic device 100 may be excluded according to the capability or structure of the electronic 100.

An earphone (not illustrated) may be inserted into the earphone connecting jack 167 to be connected to the electronic device 100. The input unit 168 may be inserted into the electronic device 100 for keeping, and when being used, may be withdrawn or separated from the electronic device 100. In a region of an inner side of the electronic device 100 into which the input unit 168 is inserted, an attach/detach recognition switch 169 is disposed to provide a signal corresponding to attachment or detachment of the input unit 168 to the controller 110. The attach/detach recognition switch 169 may be configured to directly or indirectly contact the input unit 168 when the input unit 168 is mounted. Thus, the attach/detach recognition switch 169 generates the signal corresponding to attachment or separation of the input unit 168 based on whether it contacts the input unit 168, and outputs the signal to the controller 110, and provides the generated signal to the controller 110.

The sensor module 170 includes at least one sensor for detecting a state of the electronic device 100. For example, the sensor module 170 may include at least one of a proximity sensor for detecting the user's proximity with respect to the electronic device 100, an illumination sensor (not illustrated) for detecting an amount of light around the electronic device 100, a motion sensor (not illustrated) for detecting an operation of the electronic device 100 (for example, rotation of the electronic device 100 or acceleration or vibration applied to the electronic device 100), a geo-magnetic sensor (not illustrated) for detecting a point of the compass by using the Earth's magnetic field, a gravity sensor for detecting a working direction of the gravity, and an altimeter for measuring an atmospheric pressure to detect an altitude. The at least one sensor detects a state, generates a signal corresponding to the detection, and transmits the generated signal to the controller 110. The sensor of the sensor module 170 may be added or deleted depending on the capability of the electronic device 100.

The storing unit 175 stores a signal or data which is input/output corresponding to operations of the communication module 120, the sub communication module 130, the multimedia module 140, the camera module 150, the GPS module 157, the input/output module 160, the sensor module 170, or the touchscreen 190, under control of the controller 110. The storing unit 175 may also store a control program and applications for control of the electronic device 100 and/or the controller 110.

The term "storing unit" includes the storing unit 175, the ROM 112 and the RAM 113 in the controller 110, or a memory card (not illustrated) mounted in the electronic device 100 (for example, a Secure Digital (SD) card, a memory stick). The storing unit 175 may include a non-volatile memory, a volatile memory, a Hard Disk Drive (HDD), or a Solid State Drive (SSD).

The storing unit 175 may also store applications of various functions such as navigation, video communication, games, an alarm application based on time, images for providing a Graphic User Interface (GUI) related to the applications, user information, documents, databases or data related to a method for processing touch inputs, background images (e.g., a menu screen, a standby screen, and so forth), operation programs necessary for driving the electronic device 100, and images captured by the camera module 150.

According to an embodiment of the present disclosure, in the storing unit 175, at least one user input used in a simple function execution mode and an execution function corresponding to the at least one user input may be mapped to each other and stored. According to an embodiment of the present disclosure, in the simple function execution mode, when the cover 300 coupled with the electronic device 100 covers the touchscreen 190 of the electronic device 100, a preset function is executed corresponding to a user input inputted through a covered area of the touchscreen 190.

According to one of various embodiments of the present disclosure, a user input may include various user gestures or various input patterns.

In the simple function execution mode, an execution function may be mapped to a combination of a user input and an application. That is, even for the same user input, a different function may be set to be executed according to a type of a currently executed application.

Alternatively, in the simple function execution mode, the execution function may be mapped to a user input and a sub-area of a covered area. The sub-area may mean each of a plurality of areas into which the covered area is divided. For the same user input, a different function may be set to be executed according to a type of a sub-area. Alternatively, for the same sub-area, a different function may be set to be executed according to a type of a user input.

The execution function may be mapped to a combination of a user input, a sub-area, and an application.

The execution function may be mapped to a combination of two or more user inputs. For example, the execution function may be mapped to a combination of a hovering input and a touch input.

The execution function may be mapped to a combination of a user input and a sensor value of a predetermined sensor.

The storing unit 175 is a machine, such as, for example, a non-transitory computer-readable medium. The term "machine-readable medium" includes a medium for providing data to the machine to allow the machine to execute a particular function. The storing unit 175 may include non-volatile media or volatile media. Such a medium needs to be of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash EPROM.

The power supply unit 180 supplies power to one or more batteries disposed in the housing of the electronic device 100 under control of the controller 110. The one or more batteries supply power to the electronic device 100. The power supply unit 180 may also supply power input from an external power source through the wired cable connected with the connector 165 to the electronic device 100. The power supply unit 180 may also supply power, which is wirelessly input from an external power source using a wireless charging technique, to the electronic device 100.

The electronic device 100 includes the touchscreens 190 which provides a user interface corresponding to various services (for example, call, data transmission, broadcasting, picture taking) to users. Each touchscreen outputs an analog signal, which corresponds to at least one input to the user interface, to the touchscreen controller 195. As such, the electronic device 100 may include a plurality of touchscreens, for each of which may include a touchscreen controller for receiving an analog signal corresponding to a touch. Each touchscreen may be connected to each of a plurality of housings through hinge connection or the plurality of touchscreens may be positioned in one housing without hinge connection. The electronic device 100 according to the present disclosure may include at least one touchscreen, and in the following description, one touchscreen is assumed for convenience.

The touchscreen 190 receives at least one user inputs through a user's body (for example, a finger including a thumb) or the input unit 168 (for example, a stylus pen or an electronic pen). The touchscreen 190 may also include a pen recognition panel 191 for recognizing an input inputted using a pen such as a stylus pen or an electronic pen, and the pen recognition panel 191 may recognize a distance between the pen and the touchscreen 190 based on a magnetic field. The touchscreen 190 also receives a continuous movement of one touch (i.e., a drag input). The touchscreen 190 outputs an analog signal corresponding to the received continuous movement of the touch to the touchscreen controller 195.

In the present disclosure, a touch may also include a non-contact touch (for example, when the user input unit is positioned within a distance of, for example, 5 mm or less) in which the user's body or the touchable input unit may be detected without a direct contact with the touchscreen 190, as well as a direct contact between the touchscreen 190 and the user's body or the user input unit. A distance or interval from the touchscreen 190 within which the user input unit may be detected may be changed according to the capability or structure of the electronic device 100. In particular, to separately detect a direct touch event based on a contact with the user input unit and an indirect touch event (i.e., a hovering event), the touchscreen 190 may be configured to output different values for values (for example, an analog voltage value or current value) detected in the direct touch event and the hovering event. Moreover, the touchscreen 190 may output different values (for example, current values) according to a distance between a space where a hovering input is generated and the touchscreen 190.

The touchscreen 190 may be implemented as, for example, a resistive type, a capacitive type, an infrared type, or an acoustic wave type.

The touchscreen 190 may include at least two touch panels capable of sensing a touch, an approach of a user's body and a touchable input unit to receive inputs generated by the user's body and the touchable input unit. The at least two touch panels provide different output values to the touchscreen controller, and the touchscreen controller differently recognizes the values input from the at least two touchscreen panels to identify whether the input from the touchscreen 190 is the input generated by the user's body or the touchable input unit.

More specifically, the touchscreen 190 may be formed to have a structure in which a panel for sensing an input inputted by a finger or the input unit 168 from a change of an induced electromotive force and a panel for sensing a contact of the finger or the input unit 168 on the touchscreen 190 are sequentially stacked in close contact with each other or partially spaced apart from each other. The touchscreen 190 includes multiple pixels and displays an image through these pixels. The touchscreen 190 may include a display panel such as a Liquid Crystal Display (LCD), an Organic Light Emitting Diode (OLED), or an LED.

The touchscreen 190 may include a plurality of sensors for sensing a position at which the finger or the input unit 168 contacts the surface of the touchscreen 190 or is placed within a predetermined distance from the touchscreen 190. Each of the plurality of sensors may have a coil structure, and in a sensor layer formed of the plurality of sensors, the plurality of sensors have preset patterns, respectively, and form a plurality of electrode lines. With this structure, if a contact or a hovering input occurs on the touchscreen 190 through the finger or the input unit 168, a sensing signal whose waveform is changed by a capacitance between the sensor layer and the input means is generated, and the touchscreen 190 transmits the generated sensing signal to the controller 110. A predetermined distance between the input unit 168 and the touchscreen 190 may be recognized based on a strength of a magnetic field formed by the coil 430. An operation of setting the strength of vibration will be described later.

The touchscreen controller 195 converts an analog signal received from the touchscreen 190 into a digital signal (for example, X and Y coordinates) and transmits the digital signal to the controller 110. The controller 110 controls the touchscreen 190 by using the digital signal received from the touchscreen controller 195. For example, the controller 110 may control a shortcut icon (not illustrated) or an object displayed on the touchscreen 190 to be selected or executed in response to a touch input or a hovering input. The touchscreen controller 195 may be included in the controller 110.

Moreover, the touchscreen controller 195, by detecting a value (for example, an electric-current value) output through the touchscreen 190, recognizes a distance between a space where a hovering input occurs and the touchscreen 190 and converts the recognized distance into a digital signal (for example, a Z coordinate), which it then sends to the controller 110.

Figure 4:
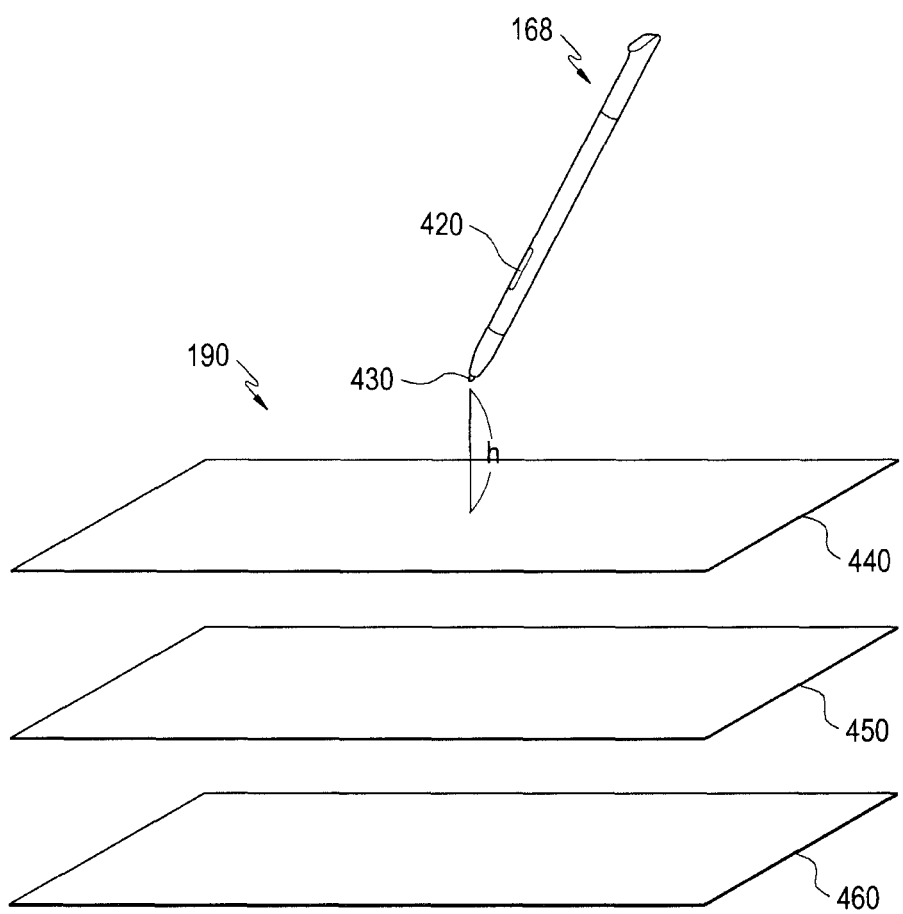
FIG. 4 is a diagram of an example of a touchscreen according to embodiments of the present disclosure.

FIG. 4 is a diagram of an example of a touchscreen, according to embodiments of the present disclosure.

As shown in FIG. 4, the touchscreen 190 may include a display panel 440, a first touch panel 450, and a second touch panel 460. The display panel 440 may be a panel such as an LCD, an AMOLED, or the like, and may display various operation states of the electronic device 100, various images corresponding to application execution and services, and a plurality of objects.

The first touch panel 450 may be a capacitive touch panel which is manufactured by coating a thin metallic conductive material (for example, an Indium Tin Oxide (ITO) layer, or the like) onto both surfaces of glass to allow electric current to flow on the surface of the glass and coating a dielectric, which is capable of storing electric charges, onto the coated surfaces. Once the input unit (for example, the user's finger or pen) touches the surface of the first touch panel 450, a predetermined amount of electric charges moves to the touched position by static electricity, and the first touch panel 450 recognizes the amount of change of current corresponding to movement of the electric charges, thus sensing the touched position. Any type of touch capable of generating static electricity may be sensed and any touch by an input unit, that is, a finger or a pen, may be sensed, through the first touch panel 450.

The second touch panel 460 is a touch panel of an Electromagnetic Resonance (EMR), and may include an electronic induction coil sensor having a grid structure in which a plurality of loop coils (not illustrated) are disposed in a predetermined first direction and a predetermined second direction intersecting the first direction and an electronic signal processor (not illustrated) for sequentially providing an alternating current signal having a predetermined frequency to the respective loop coils of the electronic induction coil sensor. If the input unit 168 having a resonance circuit embedded therein is brought near the loop coil of the second touch panel 460, a signal transmitted from the loop coil generates electric current based on mutual electromagnetic induction in the resonance circuit of the input unit 168. Based on the electric current, the resonance circuit of the input unit 168 generates and outputs an induction signal. Then, the second touch panel 460 detects the induction signal by using the loop coil, thus sensing a hovering input position or a direct touch position of the input unit 168, and the electronic device 100 may sense a height h from the display panel 440 of the touchscreen 190 to a pen point 430 of the input unit 168. The height h from the display panel 440 of the touchscreen 190 to the pen point 430 of the input unit 168 may change corresponding to the capability and structure of the electronic device 100. Through the second touch panel 460, any input unit capable of generating an electric current based on electromagnetic induction may sense a hovering input and a touch input, and the second touch panel 460 may be used for sensing a hovering input or a touch input based on the input unit 168. The input unit 168 may also be referred to as an electromagnetic pen or an EMR pen. The input unit 168 may be different from a general pen having no resonance circuit, which is sensed through the first touch panel 450. The input unit 168 may include a button 420 capable of changing an electromagnetic induction value generated by a coil disposed inside a penholder adjacent to the pen point 430.

The touchscreen controller 195 may include a first touch panel controller and a second touch panel controller. The first touch panel controller converts an analog signal received through sensing of a finger or pen touch input into a digital signal (for example, X, Y, and Z coordinates) and transmits the digital signal to the controller 110. The second touch panel controller converts an analog signal received from the second touch panel 460 through sensing of a hovering input or a touch input of the input unit 168 into a digital signal and transmits the digital signal to the controller 110. The controller 110 controls the display panel 440, the first touch panel 450, and the second touch panel 460 by using the digital signals received from the first touch panel controller and the second touch panel controller. For example, the controller 110 may display a screen in a predetermined form on the display panel 440 in response to a hovering input or a touch input inputted with the finger, the pen, or the input unit 168.

Thus, in the electronic device 100 according to an embodiment of the present disclosure, the first touch panel 450 senses a touch input inputted with a user's finger or a pen, and the second touch panel 460 senses a hovering input or a touch input inputted with the input unit 168. Thus, the controller 110 of the electronic device 100 may differently sense a touch input inputted with a user's finger or a pen and a hovering input or a touch input inputted with the input unit 168.

Figure 5:
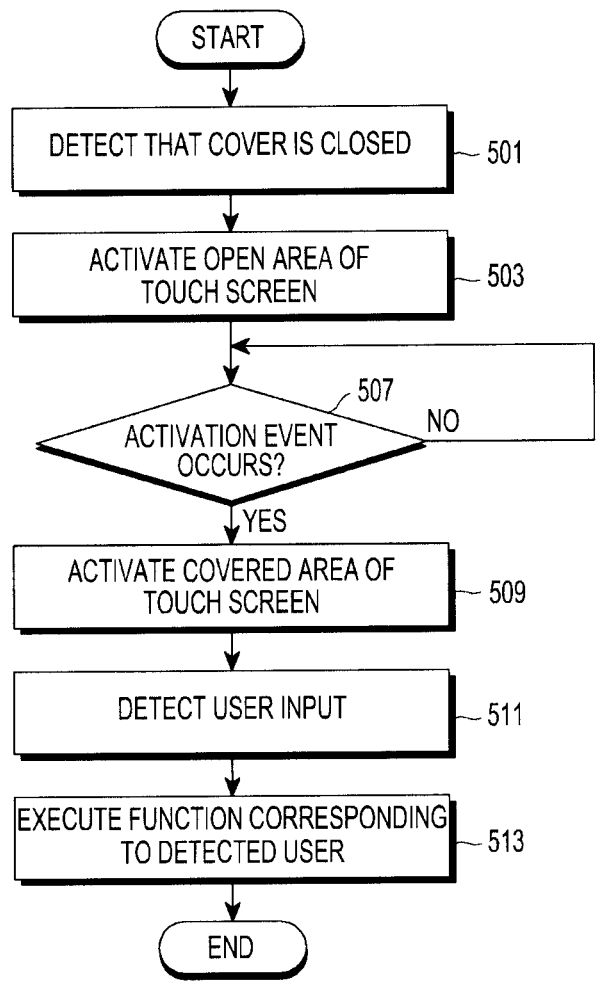
FIG. 5 is a flowchart of an example of a process according to embodiments of the present disclosure.
Figure 6:
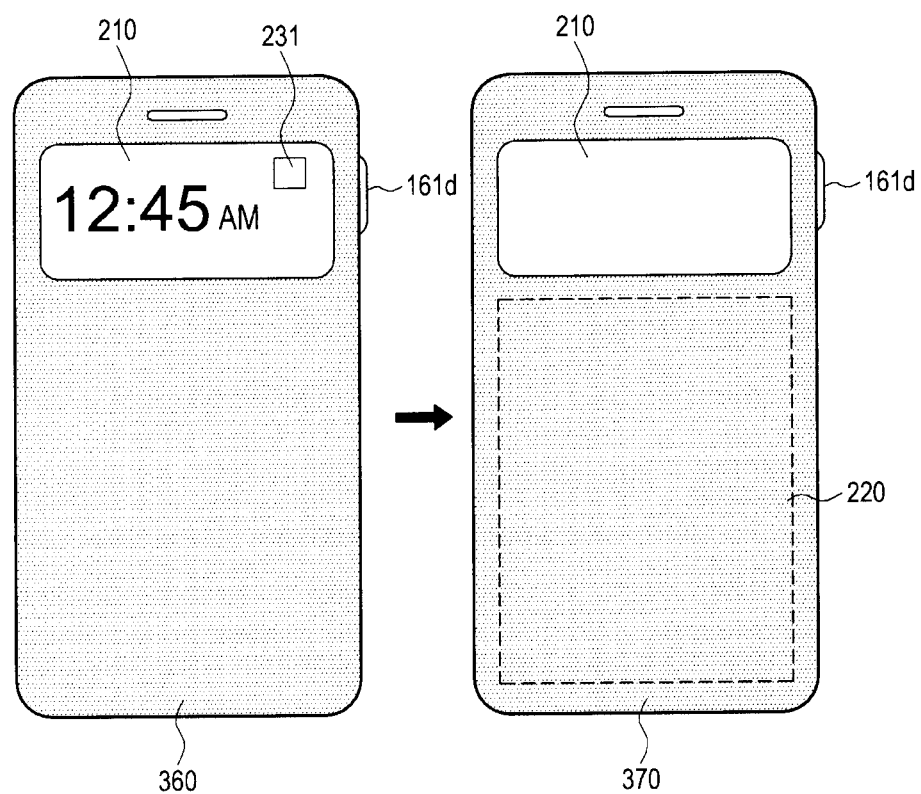
FIG. 6 is a diagram of an example of an electronic device according to embodiments of the present disclosure.

With reference to FIGS. 5 and 6, operations of the above-described electronic device 100 according to an exemplary embodiment of the present disclosure will be described. FIG. 5 is a flowchart of an example of a process, according to embodiments of the present disclosure. In operation 501, the controller 110 of the electronic device 100 detects that the cover 310 is closed. When the cover is closed, the cover device 300 is coupled to the electronic device 100 and the touch screen 190 of the electronic device 100 is covered with or closed by the cover device 300. The controller 110 activates an open area of the touchscreen 190 corresponding to the window 310 of the cover 300 in operation 503. As used throughout the disclosure, the phrase "activates an open area of the touch screen" may refer to the controller 110 entering a first state in which the controller uses input received in the open area of the touchscreen 190 to control one or more applications Upon sensing occurrence of an activation event in operation 507, the controller 110 activates the covered area of the touchscreen 190 in operation 509. The covered area may include at least a part of the remaining area of the touchscreen 190 except for the open area, and may include a part of an area occluded by the cover 300 on the touchscreen 190. As used throughout the disclosure, the phrase "activates a covered area of the touch screen" may refer to the controller 110 entering a second state in which the controller uses at least some input received in the covered area as a basis for executing the one or more functions.

Thus, the user may input various user gestures or patterns on the covered area of the touchscreen 190. For example, the user may enter a touch input or a hovering input by using the input unit 168 or enter a touch input by using a finger.

In operation 511, the controller 110 detects a user input that is entered in the covered area of the touchscreen 190. For example, the user input may be a symbol, a character, a note, or the like. The user input may be recognized as a pattern or a gesture. In operation 513, the controller 110 may control the electronic device 100 to identify a function previously stored corresponding to a detected user pattern and to execute the function.

FIG. 6 illustrates an active area of a touchscreen according to an exemplary embodiment of the present disclosure. As in a state 360 of FIG. 6, when the cover 300 is coupled to the electronic device 100 and thus the touchscreen 190 of the electronic device 100 is covered with or closed by the cover 300, a sensor value of the proximity sensor 170*b* is delivered to the controller 110, such that the controller 110 of the electronic device 100 detects a cover-closed state in operation 501 of FIG. 5. Alternatively, a sensor value of a hall sensor (not illustrated) or a geo-magnetic sensor (not illustrated) is delivered to the controller 110, such that the controller 110 of the electronic device 100 detects the cover-closed state in operation 501 of FIG. 5. Thus, the controller 110 activates an open area 210 of the touchscreen in operation 503. The open area 210 may be an area corresponding to the window 310 of the cover 300. As the open area 210 is activated, the controller 210 controls information or an object corresponding to an operation of the electronic device 100 at the current point in time to be displayed on the open area 210. For example, if the electronic device 100 is in a standby state where a particular application or function is not executed, then time information, date information, weather information, or the like may be displayed on the open area 210. If the electronic device 100 currently executes a specific application, information about the currently executed application may be additionally displayed on the open area 210. Upon activation of the open area 210, the electronic device 100 may receive a user input, for example, a touch input or a hovering input, through the open area 210.

In FIG. 6, a state 360 illustrates an example in which a standby screen corresponding to a standby state is displayed on the open area 210. Referring to FIG. 6, time information may be displayed on the open area 210. An activation icon 231 for requesting activation of the covered area 220 may also be displayed on the open area 210. The covered area 220 may include at least a part of the remaining area of the touchscreen 190 except for the open area 210, and may also include a part of an area occluded by the cover 300 on the touchscreen 190. In an embodiment of FIG. 6, the covered area 220 is assumed to be positioned under the open area 210. Even if the covered area 220 is activated, the user may substantially touch the surface of the cover 300 or may make a hovering input above the surface of the cover 300. However, in a state 370, the covered area 220 has already been activated, such that the electronic device 100 may sense a user input and perform a corresponding operation.

According to another embodiment of the present disclosure, as a user's selection gesture with respect to the activation icon 231 is input, an activation event may be detected. The activation event may trigger the activation of the covered area 220 and may be generated in response to the activation icon 231 being activated (e.g., touched) or the button 161d being activated (e.g., pressed). Additionally or alternatively, the activation event may also be generated in response to the sending/reception of a call or transmission/reception of a message or another type of communication, such as a telephone call or email. Additionally or alternatively, the activation event may also occur as a predetermined application is executed.

According to various embodiments of the present disclosure, with reference to FIGS. 7 through 14, a description will be made of an example of operation and execution screen of the electronic device 100 when a user input is a symbol, a character, or a note.

Figure 7:
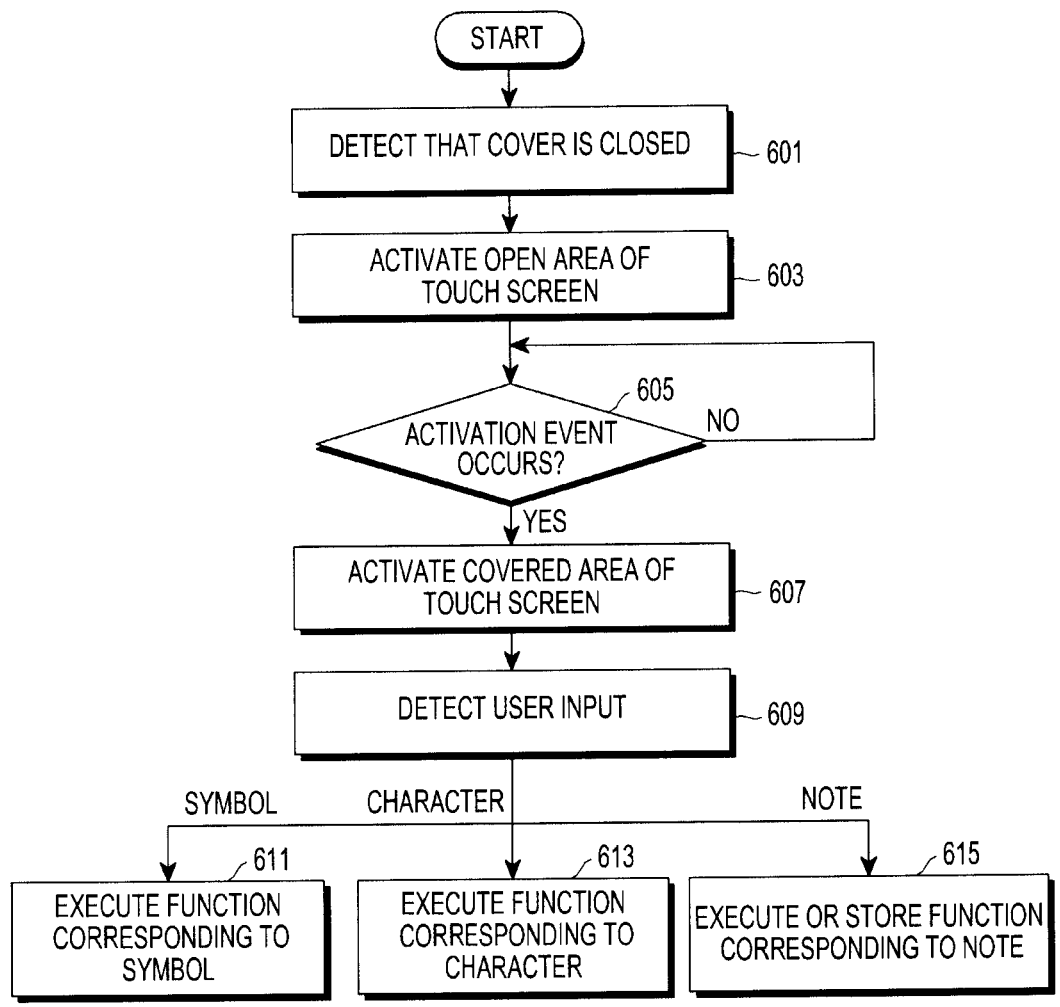
FIG. 7 is a flowchart of an example of a process according to embodiments of the present disclosure.

FIG. 7 is a flowchart of an example of a process, according to embodiments of the present disclosure.

Referring to FIG. 7, upon detecting that a cover is closed in operation 601, the controller 110 of the electronic device 100 activates an open area of the touchscreen 190 in operation 603. As an operation, such as a user input, call sending/reception, or message transmission/reception, is performed, the controller 110 determines whether an activation event occurs in operation 605. As the activation event occurs, the controller 110 activates the covered area 220 of the touchscreen 190 in operation 607.

As the covered area 220 is activated, the user inputs a user gesture through the covered area 220 by using a finger or the input unit 168. For example, the user may draw a specific symbol or write down a specific character or number on the covered area 220. The user input may be classified into a symbol, a character, and a memo according to embodiments of the present disclosure. The symbol is an input pattern indicating a symbol such as various figures or an index. The character is an input pattern indicating a character or a number corresponding to various languages. The memo is an input pattern in which a plurality of characters are combined to be processed as a note. As the user inputs a user gesture through the covered area 200, the controller 110 detects the input of the user gesture and detects a user input corresponding to the user gesture in operation 609.

The controller 110 identifies the pattern defined by user input. If the user input is a symbol, the controller 110 executes a function corresponding to the pattern of symbol in operation 611.

The controller 100 identifies the pattern defined by user input. If the user input detected in operation 609 is a character, the controller 110 executes a function corresponding to the pattern of character in operation 613.

If the user input detected in operation 609 is a note, the controller 110 executes a function corresponding to the memo or stores the memo in operation 615.

FIGS. 8 through 14 illustrate examples of a display screen of the electronic device 100 according to various embodiments of the present disclosure. To help the understanding of the present disclosure, a description will be made assuming that the open area of the electronic device 100 is in a standby state prior to activation of the covered area.

Figure 8:
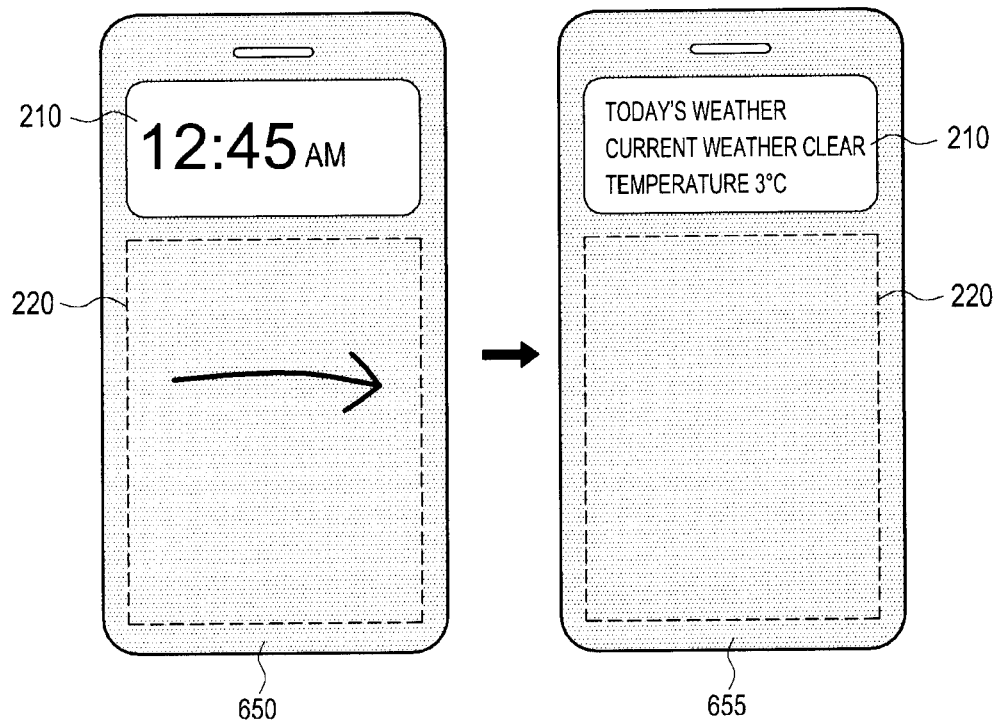
FIG. 8 is a diagram of an example of an electronic device according to embodiments of the present disclosure.

In FIG. 8, when the covered area 220 of the touchscreen 190 is currently activated (or in an active state), the user inputs an arrow into the covered area 220. Referring to FIG. 8, as in a state 650, the user may draw an arrow directed to the right from the left on the covered area 220. Thus, the controller 110 determines that the user input defines an arrow symbol, and executes a function corresponding to (e.g., associated with) the arrow symbol. In the example illustrated in FIG. 8, it is assumed that a function corresponding to the right arrow is one that displays weather information. Thus, the controller 110 executes a weather application to display today's weather information on the open area 210 as in a state 655 of FIG. 8. Different functions may be registered for arrows in different directions, for example, a left arrow, an upward direction, and a downward direction.

Figure 9:
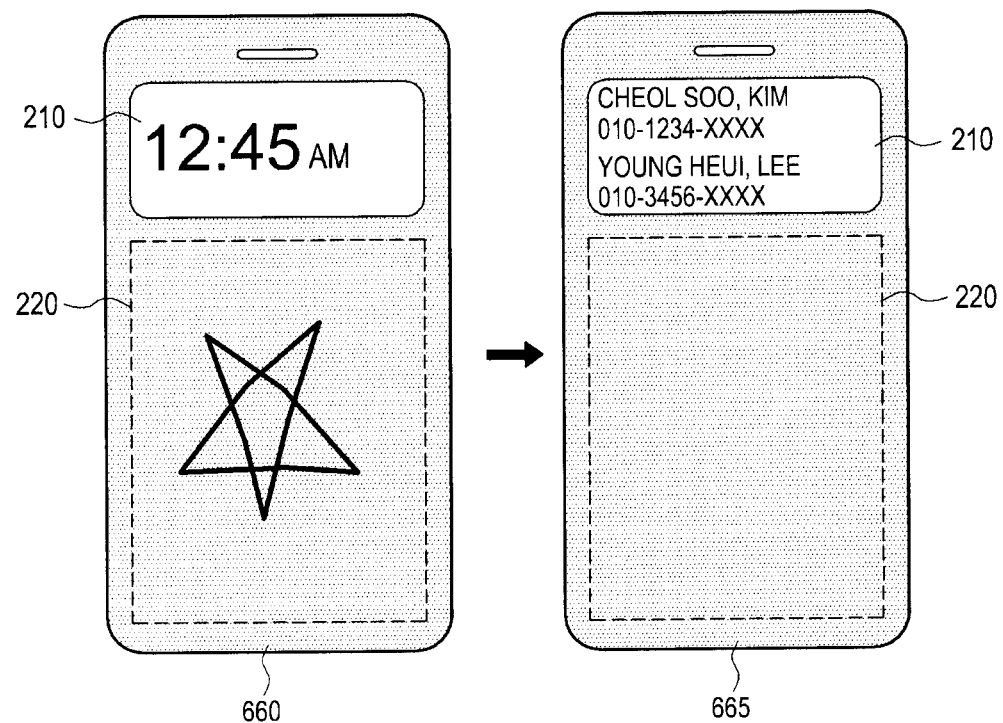
FIG. 9 is a diagram of an example of an electronic device according to embodiments of the present disclosure.

FIG. 9 illustrates one of various embodiments of the present disclosure, in which the user inputs a figure onto the covered region 220 when the covered area 220 of the touchscreen 190 is in an active state.

As in a state 660 of FIG. 9, the user may draw a star on the covered area 220. Thus, the controller 110 determines that the user input defines a star pattern, and executes a function corresponding to the star pattern. In an example illustrated in FIG. 9, the function corresponding to the star may be providing a list of users that are designated as favorite users in a contacts list. The controller 110 then executes a contacts list application to display the favorite user list in the open area 210 as in a state 665 of FIG. 9. In this state, if the user enters a touch input or a hovering input from top to bottom or from bottom to top on the covered area 220, the favorite user list may be scrolled to the bottom or top, respectively.

Figure 10:
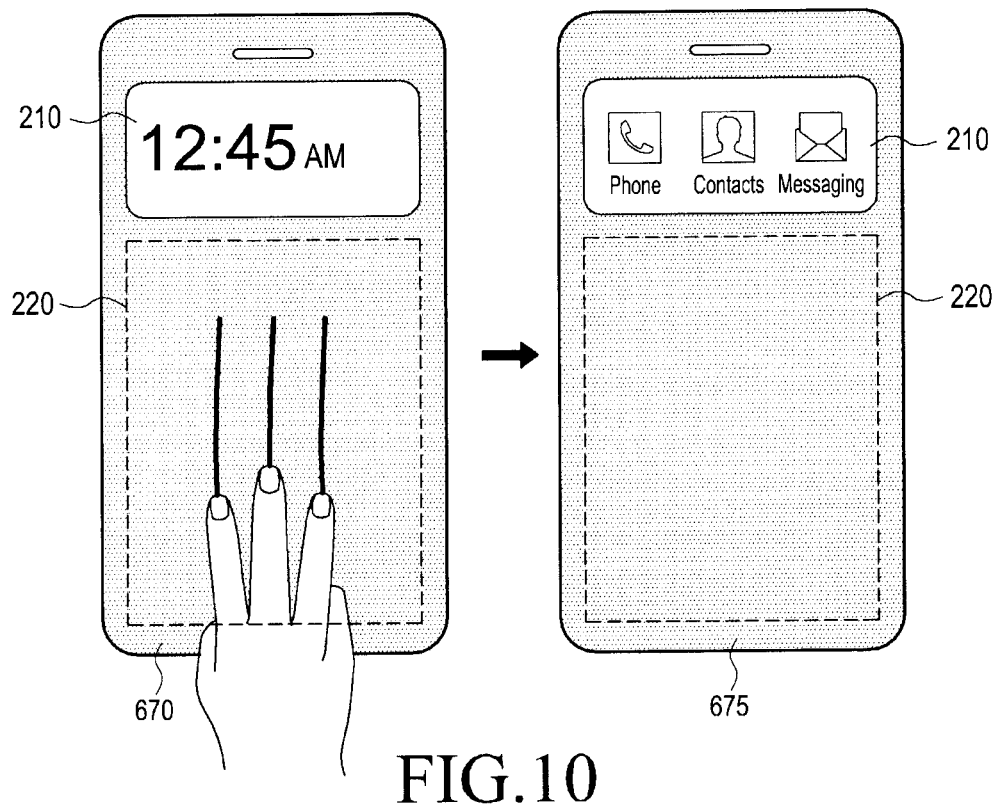
FIG. 10 is a diagram of an example of an electronic device according to embodiments of the present disclosure.

FIG. 10 illustrates one of various embodiments of the present disclosure, in which the user inputs a straight line onto the covered area 220 when the covered area 220 of the touchscreen 190 is in an active state. As in a state 670 of FIG. 10, the user touches the covered area 220 with three fingers at the same time to draws a pattern comprising three straight lines. Thus, the controller 110 determines that the user input is a symbol, and executes a function corresponding to the drawn pattern. In the example illustrated in FIG. 10, the function corresponding to the three straight lines may be providing a list of applications that are frequently used among a plurality of applications installed on the electronic device 100. Hence, as in a state 675 of FIG. 10, the controller 110 controls one or more icons of a frequently used application to be displayed on the open area 210. Thereafter, the user touches an application icon on the open area 210 or inputs a user gesture for selecting a particular application icon on the open area 220, to request execution of the application.

According to another embodiment of the present disclosure, the user may touch the covered area 220 with two fingers at the same time, to draw two straight lines from top to bottom. Thus, the controller 110 determines that the user input is a symbol, and sets a function corresponding to the two straight lines that are input at the same time, for example, a vibration mode of the electronic device 100. The controller 110 may also set a function of releasing the vibration mode to correspond to a user input of drawing two straight lines from bottom to top.

Although not illustrated in FIGS. 8 through 10, various symbol patterns may be mapped to different execution functions. For example, if a triangular symbol is detected, a short-range wireless communication module, for example, Bluetooth, Wi-Fi, or an NFC module, may be turned on or off. When an incoming call is received in and thus information indicating an incoming call is displayed on the open area 210, if the user inputs 'X' onto the covered area 220, the controller 110 may decline the call.

Figure 11:
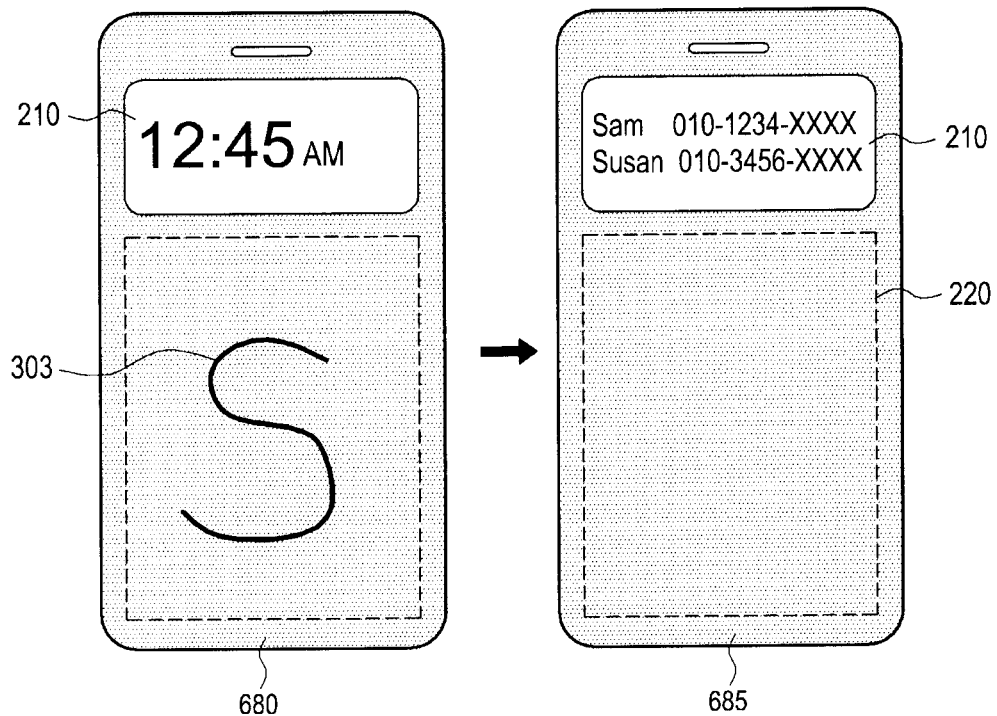
FIG. 11 is a diagram of an example of an electronic device according to embodiments of the present disclosure.

FIG. 11 illustrates one of various embodiments of the present disclosure, in which the user inputs a character onto the covered area 220 when the covered area 220 of the touchscreen 190 is in an active state. For example, as in a state 680 of FIG. 11, the user may write down the English letter 'S' on the covered area 220. Thus, the controller 110 determines that the user input defines the shape of a specific character, and executes a function corresponding to the character, that is, a function corresponding to the English letter 'S'. In the example illustrated in FIG. 11, the function corresponding to the English letter 'S' may be providing a list of contact information registered with a user name beginning with the English letter 'S' from a contact list stored in the electronic device 100. Thus, as in a state 685 of FIG. 11, the controller 110 displays the list of the contact information registered with a user name beginning with the English letter 'S' on the open area 210. Thereafter, the user touches an item of the displayed list on the open area 210 or inputs a user gesture for selecting a particular item on the covered area 220, to request call sending to a corresponding user.

Figure 12:
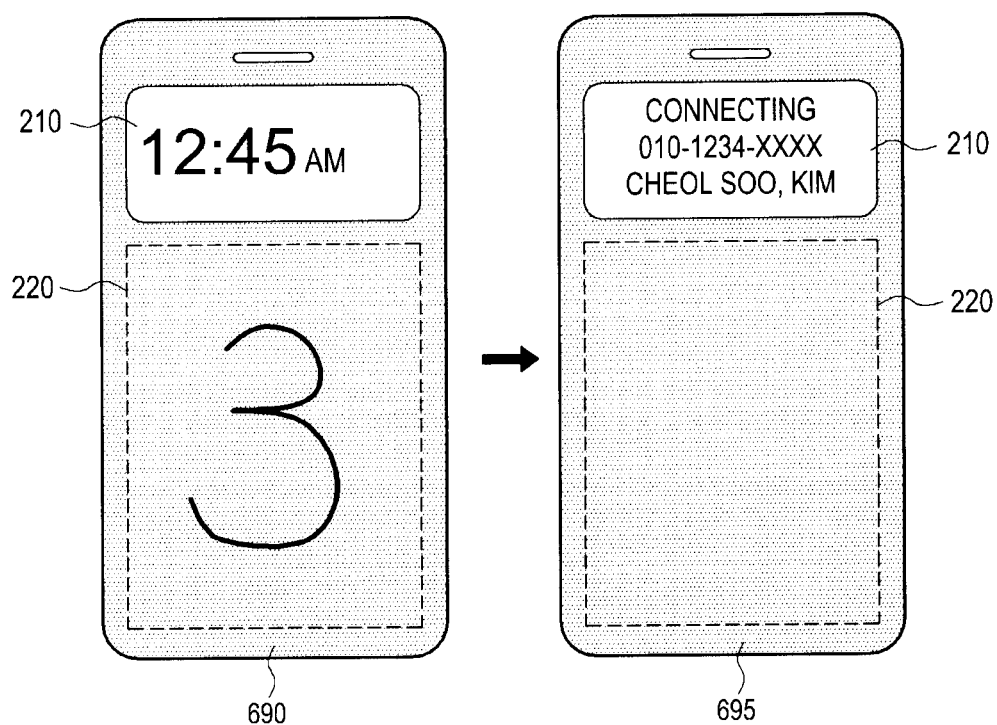
FIG. 12 is a diagram of an example of an electronic device according to embodiments of the present disclosure.

FIG. 12 illustrates one of various embodiments of the present disclosure, in which the user inputs a number onto the covered area 220 when the covered area 220 of the touchscreen 190 is in an active state. As in a state 690 of FIG. 12, the user writes down a number '3' onto the covered area 220. Thus, the controller 110 detects that the user input defines the shape of the number "3" and executes a function corresponding to the number, that is, a function registered corresponding to the number '3'. In the example illustrated in FIG. 12, the function corresponding to the number may be a shortcut dialing function. Hence, as in a state 695 of FIG. 12, the controller 110 sends a call to user contact information registered corresponding to the number '3' and displays outgoing-call information on the open area 210.

Figure 13:
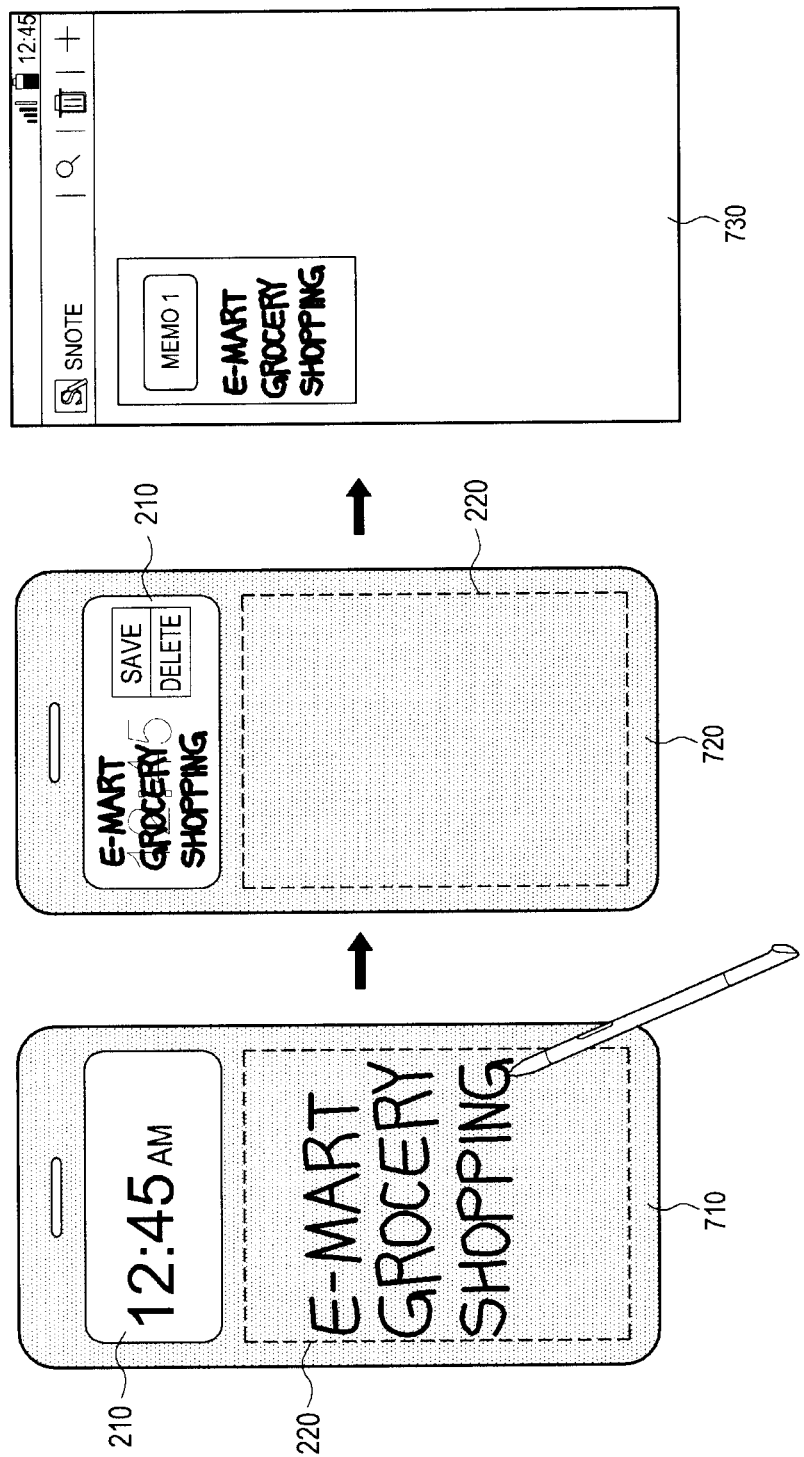
FIG. 13 is a diagram of an example of an electronic device according to embodiments of the present disclosure.

FIG. 13 illustrates one of various embodiments of the present disclosure, in which the user writes down a memo onto the covered area 220 when the covered area 220 of the touchscreen 190 is in an active state. As in a state 710 of FIG. 13, the user may write down a plurality of characters on the covered area 220. Thus, the controller 110 determines that the user input is a note, and displays an input character string on the open area 210 as in a state 720 of FIG. 13. Input characters may be displayed overlappingly on information displayed on the open area 210 as in the state 720 of FIG. 13. The controller 110 converts the input characters into a text by using an Optical Character Recognition (OCR) function and analyzes the text. If a particular application function corresponding to the character string is registered, the controller 110 executes a corresponding function; otherwise, if the particular application function is not registered, the controller 110 stores the character string as a note. For example, if a character string is "Play music" and a music playback function is registered corresponding to the character string "Play music", then the controller 110 plays back music stored in the storing unit 175 of the electronic device 100. However, if a particular function is not registered corresponding to the analyzed character string, the character string may be stored as a memo as in a state 730 of FIG. 13. According to another embodiment, a character string may also be registered corresponding to a schedule application.

According to another embodiment of the present disclosure, character strings of a memo may not be displayed on the open area 210.

Figure 14:
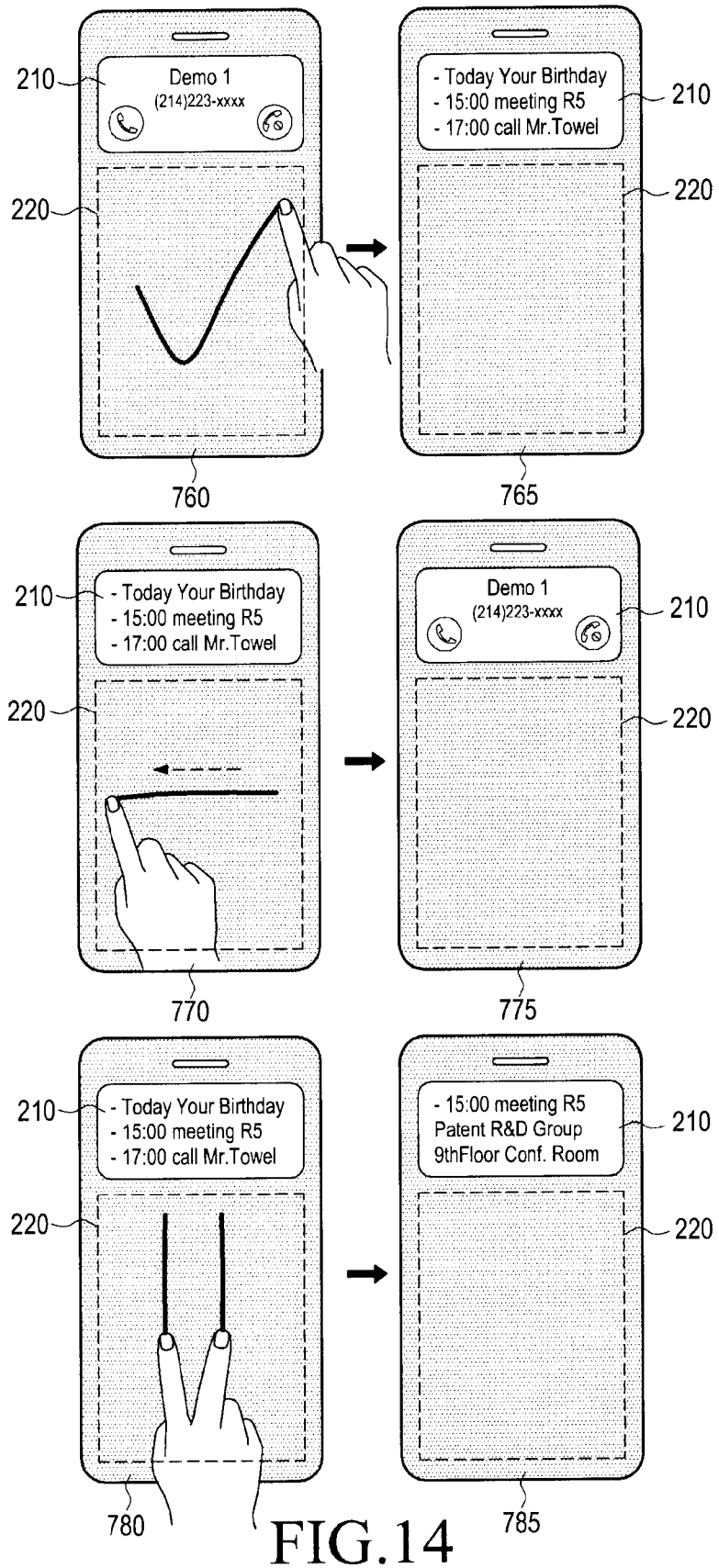
FIG. 14 is a diagram of an example of an electronic device according to embodiments of the present disclosure.

FIG. 14 illustrates a screen of an electronic device according to various embodiments of the present disclosure.

In FIG. 14, according to an embodiment of the present disclosure, when the electronic device 100 is coupled with the cover 300 and the cover 300 is closed, a simple function is executed during execution of an application. In the example illustrated in FIG. 14, the currently executed application is a telephony application.

Referring to FIG. 14, a state 760 shows that information about a counterpart to which a call is connected is displayed on the open area 210. When needing to check a schedule during a conversation over the phone, the user may input, onto the covered area 220, a check symbol mapped to a today's schedule check function of a schedule application. As the user gesture defining the check symbol is input, the controller 110 of the electronic device 100 executes the schedule application and displays a today's schedule list on the open area 210 as in a state 765 of FIG. 14.

Thereafter, to display again the information about the counterpart, the user may input a user gesture mapped to a previous screen function onto the covered area 220, as in state 770. A user input mapped to the previous screen function is assumed to be a straight line drawn from the right to the left. As the straight line drawn from the right to the left is input to the covered area 220, the controller 110 displays call state information on the open area 210 as in a state 775. To display detailed information corresponding to each schedule item in the today schedule list displayed on the open area 210, the user may input a user gesture for selecting a corresponding schedule item onto the covered area 220. In the example illustrated in FIG. 14, two straight lines drawn at the same time from top to bottom are assumed to be mapped to a detailed information display function, as in state 780. When the user draws straight lines with two fingers on the covered area 220, the controller 110 executes a schedule application and a schedule detailed information function corresponding to a combination of the two straight lines that are input at the same time, and displays detailed information corresponding to a specific item that is currently displayed in the open area 210 as in a state 785. When an application is executed, the controller 110 may control a menu and a function of the application according to a user input inputted onto at least a part of the covered area.

According to various embodiments of the present disclosure, the covered area 220 may be divided into a plurality of sub-areas, and a function of the electronic device 100 may be executed corresponding to a combination of each sub-area and a specific user gesture. In this case, the plurality of sub-areas forming the covered area 220 may be separately activated. In other words, upon occurrence of an activation event, at least one sub-area is activated.

Figure 15:
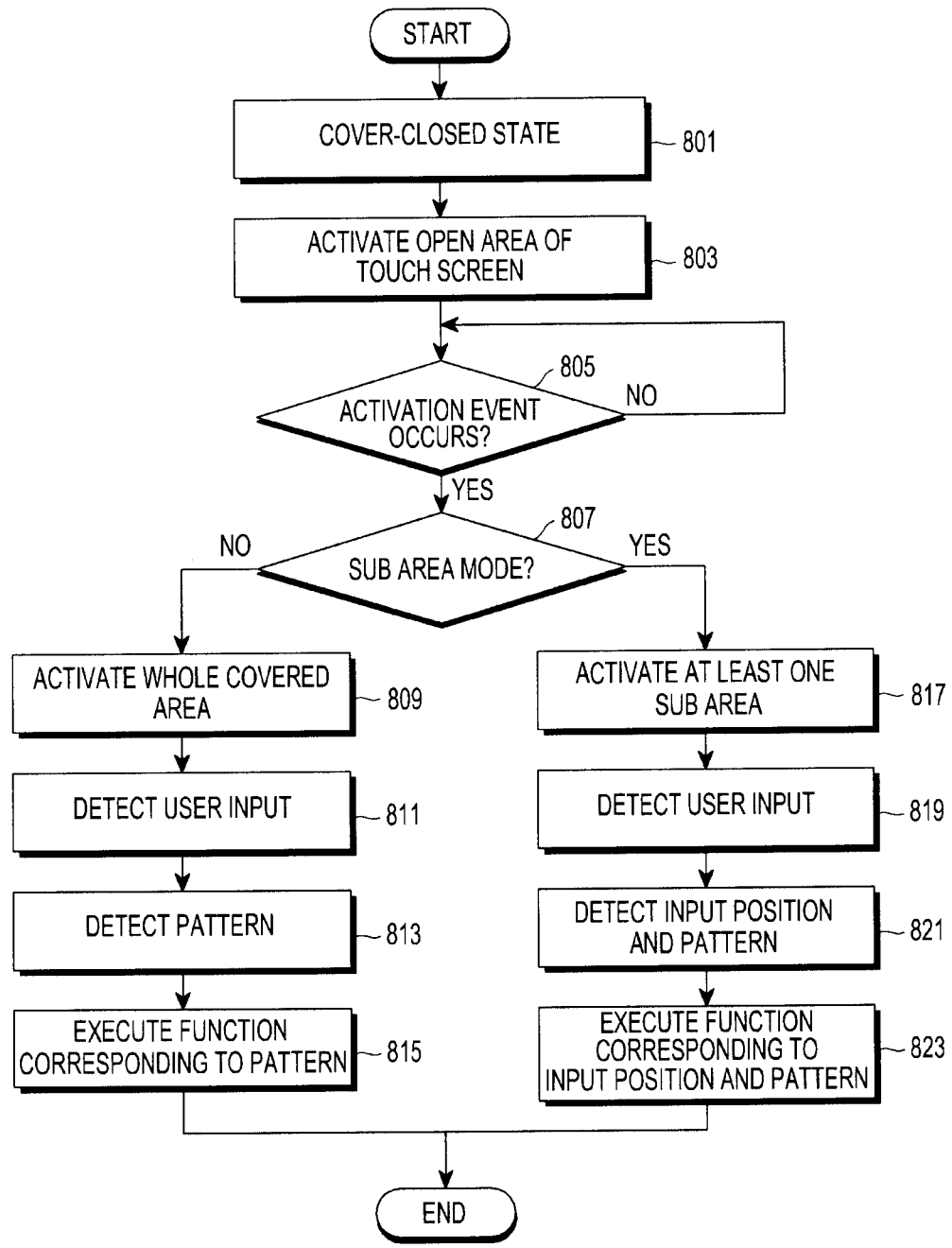
FIG. 15 is a flowchart of an example of a process according to embodiments of the present disclosure.

FIG. 15 is a flowchart of an example of a process, according to aspects of the disclosure. In operation 801, the controller 110 of the electronic device 100 detects that a cover is closed and activates an open area of the touchscreen 190 in operation 803. Thereafter, as an operation, such as a user input, call sending/reception, or message transmission/reception, is performed in the standby mode, the controller 110 determines whether the activation event occurs in operation 805.

When an activation event is detected, the controller 110 determines whether to enter a sub-area mode in operation 807. In the sub-area mode, the cover area 220 is divided into a plurality of sub-areas, each of which is individually activated or used. In some implementations, the controller 110 may determine whether to enter the sub-area mode according to a type of the activation event. For example, if the activation event is generated in response to the receipt of an incoming message (e.g., SMS, MMS, etc.), the controller 110 may enter the sub-area mode. Alternatively, if the activation event is generated in response to a button being pressed, the controller 110 may refrain from entering the sub-area mode.

If determining not to set the sub-area mode in operation 807, the controller 110 goes to operation 809 to activate the whole covered area 220 without area division. Then, upon detection of input of a user gesture in operation 811, the controller 110 detects a pattern defined by the user gesture in operation 813 and executes a function corresponding to the pattern in operation 815.

If determining to set the sub-area mode in operation 807, the controller 110 executes operation 817 to activate at least one sub-area in the covered area 220. According to one of various embodiments of the present disclosure, some or all of the sub-areas that are available in the covered area 220 may be activated. When a given sub-area is activated, input detected in that area may be used as a basis for performing a function associated with that sub-area. By contrast, when the given sub-area is maintained in an inactive state, the controller may refrain from using any input that is received in the given sub-area as a basis for performing the function. Thus, according to aspects of the disclosure, gestures performed in the given sub-area may trigger the performance of the function only when the given sub-area is activated.

According to one of various embodiments of the present disclosure, upon detecting a user input in operation 819 after activating at least one sub-area in operation 817, the controller 110 detects a position at which the user input is generated and a pattern corresponding to the user input in operation 821. If the user input is generated on an active sub-area, the controller 110 executes a function corresponding to the sub-area where the user input is generated and to the pattern corresponding to the user input in operation 823. For example, if a sub-area A and a sub-area B are activated in operation 817 and if a user gesture is performed the sub-area B, then a function corresponding to a combination of the sub-area B and the user gesture A may be executed. If the same user gesture is in the sub-area A, a different function corresponding to the combination of the sub-area A and the user gesture may be executed. Thus, in some implementations, the same user gesture may trigger the performance of different function depending on what sub-area is the user gesture performed in.

Although not illustrated in FIG. 15, after executing the function corresponding to the sub-area and the user input in operation 823, the controller 110 may activate an inactive sub-area or deactivate an active sub-area and repeat operations 819 through 823.

Figure 16:
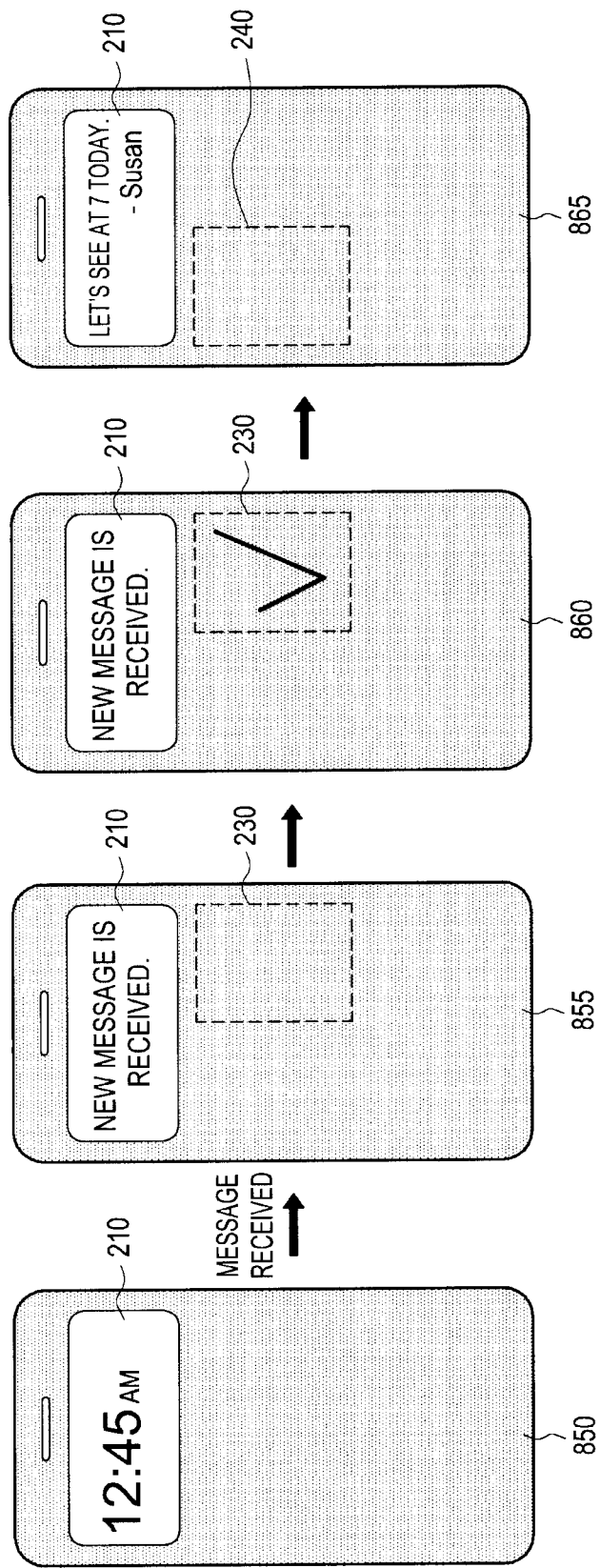
FIG. 16 is a diagram of an example of an electronic device according to embodiments of the present disclosure.

According to one of various embodiments of the present disclosure, as illustrated in FIG. 16, if the electronic device 100 receives a message in a state 850 where only the open area 210 is activated, an activation event corresponding to message reception occurs. As a message application is executed, the sub-area mode is set in a state 855, such that at least one sub-area of the covered area 220, that is, a first sub-area 230 is activated, and information indicating message reception is displayed on the open area 210. In the embodiment illustrated in FIG. 16, it is assumed that the covered area 220 is divided into four sub-areas and the first sub-area 230 is activated in response to the receipt of the message. A user gesture corresponding to a function of displaying the content of the received message is assumed to be inputting a check symbol on the first sub area 230. According to another embodiment, all of the four sub areas may be activated corresponding to message reception.

To view the content of the received message, the user may input a check symbol onto the first sub-area 230. If the check symbol is input onto a part of the covered area 220 other than the first sub-area 230, the content of the received message may not be displayed on the open area 210.

In the embodiment illustrated in FIG. 16, as in a state 860, if the user inputs a check symbol onto the first sub-area 230, then the controller 110 detects input of a user gesture corresponding to the check symbol on the first sub-area 230 and displays the content of the message on the open area 210 as in a state 865. As the controller 110 executes the message content display function, the controller 110 deactivates the first sub-area 230 and activates the second sub-area 240. Thereafter, the user may request execution of a proper message application function, for example, message deletion, by inputting a proper user gesture onto the first sub-area 230.

In this way, by dividing the covered area 220 into the plurality of sub-areas and matching a user gesture to each sub-area, various functions may be executed. According to an embodiment of the present disclosure, the user may designate the number of sub-areas of the covered area 200, a position of each sub-area, and a user gesture and an execution function corresponding to each sub-area.

Figure 17:
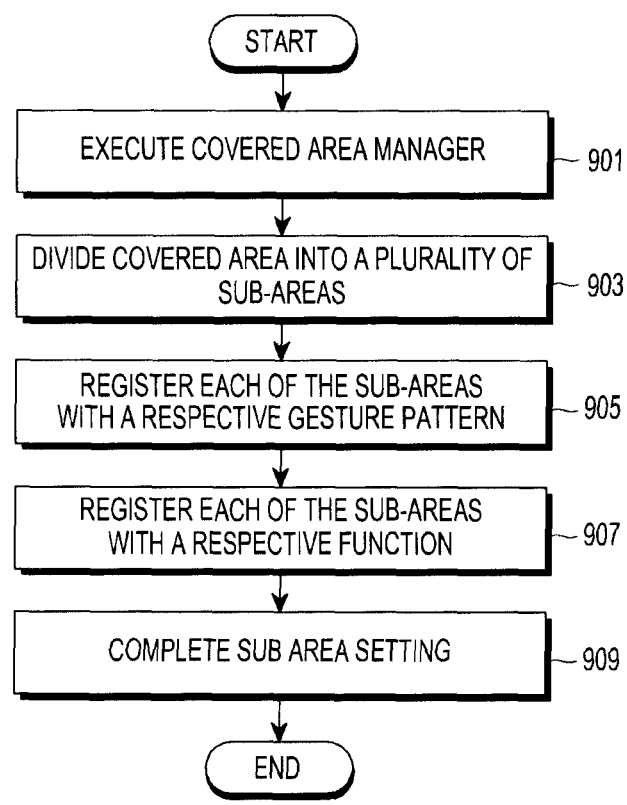
FIG. 17 is a flowchart of an example of a process according to embodiments of the present disclosure.

FIG. 17 is a flowchart of an example of a process. Referring to FIG. 17, the controller 110 executes a covered area manager application at the request of the user in operation 901. The covered area manager application may allow the user to designate the number of a plurality of sub-areas of a covered area, a position of each sub-area, and a user gesture and an execution function corresponding to each sub-area. Thus, the covered area may be visually displayed on the touchscreen 190.

The user may designate the number of sub-areas to be created, along with the position, size, and shape of each of the sub-areas. For example, the user may divide the covered area into a plurality of sub-areas in a horizontal direction or in a vertical direction or in a lattice pattern. According to such a user input, the controller 110 divides the covered area into the plurality of sub-areas in operation 903.

The user then registers each of the sub-areas with a respective gesture pattern. For example, if the user selects one of the sub-areas and inputs a gesture having a specific pattern, then the controller 110 registers the pattern with the sub-area in operation 905.

In operation 907, the user may also register each of the sub-areas with a respective function. For example, if the user selects one of the plurality of sub-areas, applications or an application function list may be displayed on the selected sub-area. If there is a registered user input on the selected sub-area, the registered user input may also be displayed. The user may then select an application or an application function that is to be registered with the selected sub-area.

In operation 909, the controller 110 completes the sub-area setting. For example, the user may divide the covered area into a sub-area A, a sub-area B, and a sub-area C, register a user gesture shaped like a star on the sub-area B, and also register an unlock function with the sub-area B. Thus, upon occurrence of the activation event, the controller 100 activates the sub-area B, and executes the unlock function when the star-shaped user gesture is input onto the sub-area B.

In this way, as the user designates a sub-area, a user gesture, and an execution function, users' various demands may be satisfied.

Figure 18:
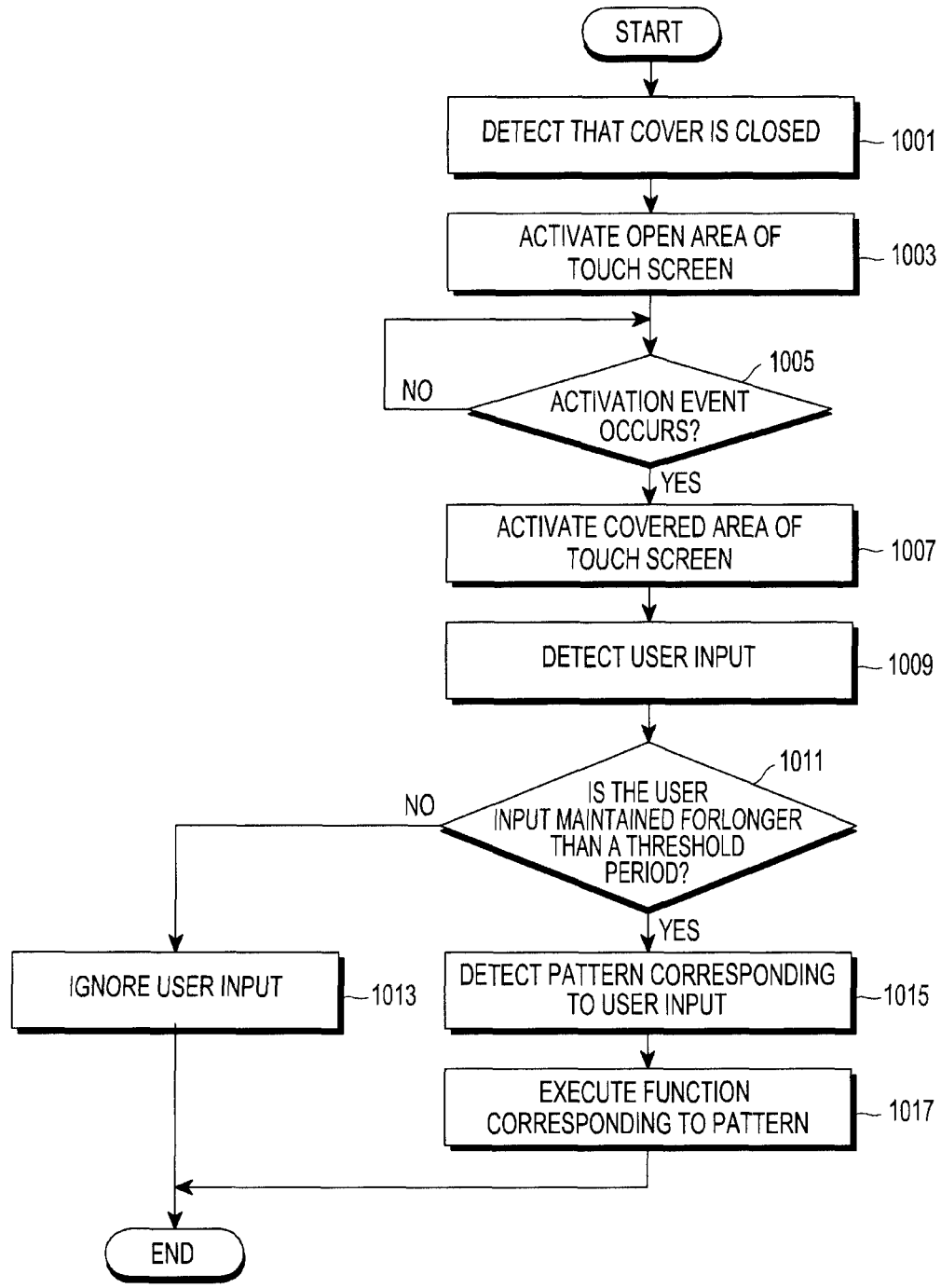
FIG. 18 is a flowchart of an example of a process according to embodiments of the present disclosure.

According to another embodiment of the present disclosure, malfunction may be reduced in user input detection on the covered area 220, as will be described with reference to FIG. 18. FIG. 18 is a flowchart of an example of a process, according to aspects of the disclosure.

Referring to FIG. 18, upon detecting that the cover 300 is closed, the controller 110 of the electronic device 100 activates the open area of the touchscreen 190 in operation 1003. As an operation, such as a user input, call sending/reception, or message transmission/reception, is performed, the controller 110 determines whether the activation event occurs in operation 1005. Thus, in operation 1007, the controller 110 activates the covered area 220 of the touchscreen 190. In operation 1009, the controller 110 detects a user input.

In operation 1011, the controller 110 determines whether a duration of the user input exceeds a threshold. In some implementations, the duration of the using input may be the time it takes for the user input to be completed after it has started. For example, if the user first touches the touchscreen 190 with an electronic pen and then maintains a touch, the user input may be continuously detected. However, if the touch is not maintained for a predetermined time period after the touch is first established, then the user input sensed in operation 1009 may be an invalid input. For example, as an object grazes the touchscreen 190 regardless of user's intention, the user input may be sensed and processing this input as an invalid input may improve the efficiency of the electronic device 100. Thus, if no user input is re-generated within a predetermined time from detection of the user input in operation 1009, then the user input detected in operation 1009 may be ignored. As such, checking the user input for a predetermined time may prevent the malfunction of the electronic device 100.

If the duration of the user input does not exceed the threshold, the controller 110 proceeds to operation 1013 to ignore the user input.

If the duration of the user input exceeds the threshold, the controller 110 detects a pattern corresponding to the user input in operation 1015. If the pattern corresponding to the user input is detected, the controller 110 executes a function corresponding to the pattern in operation 1017.

Figure 19:
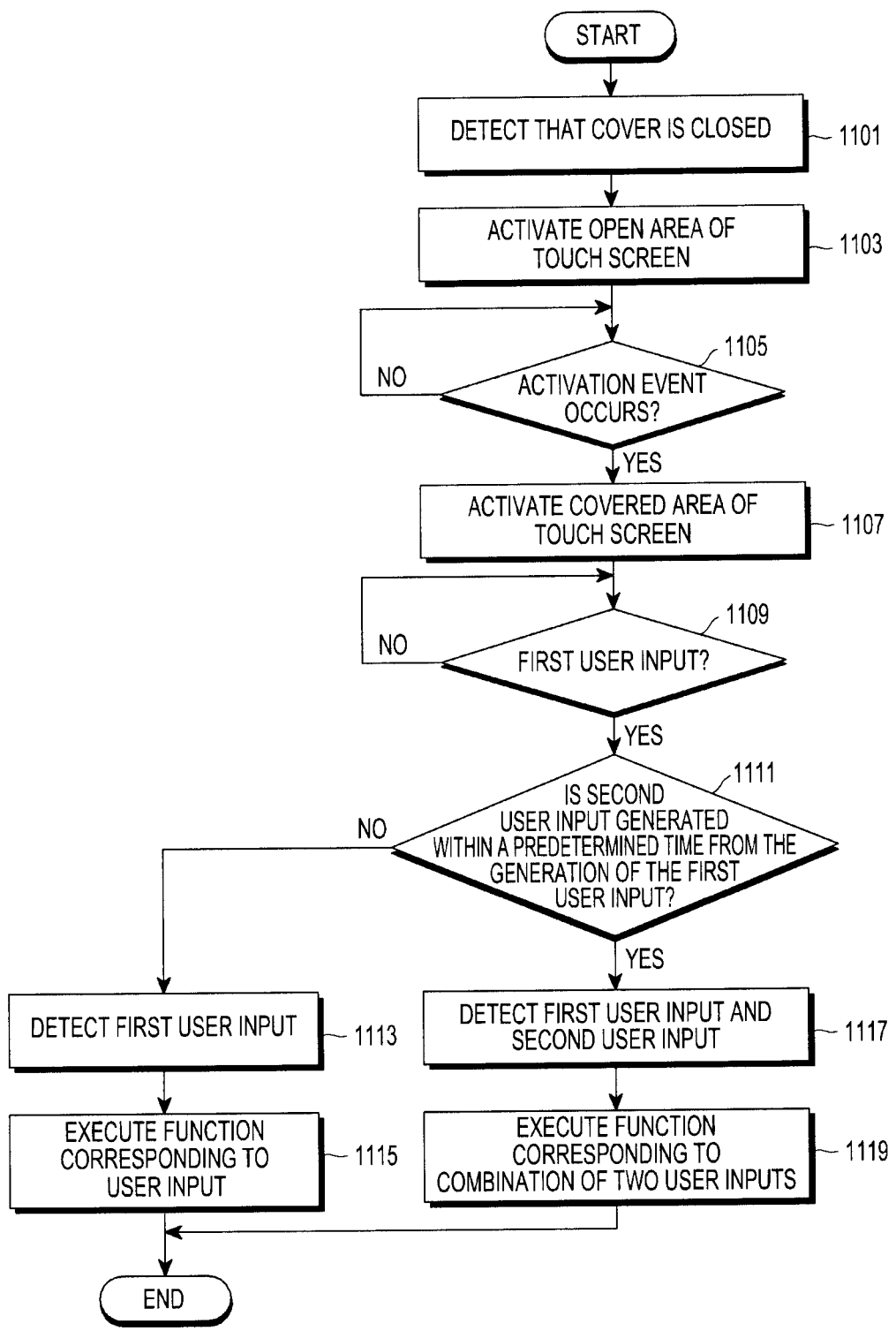
FIG. 19 is a flowchart of an example of a process according to embodiments of the present disclosure.

According to another embodiment of the present disclosure, the function of the electronic device 100 may be executed corresponding to a combination of types of a plurality of user inputs. The user input types may be classified into a touch input and a hovering input, as will be described with reference to FIG. 19. FIG. 19 is a flowchart of an example of a process, according to aspects of the disclosure. In FIG. 19, it is assumed that one of the hovering input and the touch input is a first user input and the other is a second user input.

Referring to FIG. 19, upon detecting the cover 300 is closed in operation 1101, the controller 110 of the electronic device 100 activates the open area of the touchscreen 190 in operation 1103. As an operation, such as a user input, call sending/reception, or message transmission/reception, is performed, the controller 110 determines whether an activation event occurs in operation 1105. Thus, in operation 1107, the controller 110 activates the covered area 220 of the touchscreen 190 if determining that the activation event occurs. In operation 1109, the controller 110 detects generation of the first user input.

In operation 1111, the controller 110 determines whether the second user input is detected within a predetermined time after the detection of the first user input. If the second user input is not detected within the predetermined time period, the controller 110 detects a pattern corresponding to the first user input in operation 1113 and executes a function corresponding to the pattern in operation 1115.

If the second user input is generated within the predetermined time, the controller 110 detects a pattern corresponding to the first user input and the second user input in operation 1117. The controller 110 executes a function corresponding to a combination of the two patterns in operation 1119.

For example, if in a state in which an incoming message is received, but not yet read, the user makes a user input corresponding to a check symbol as a hovering input and touches the covered area 220 of the electronic device 100, the content of the received message may be displayed.

According to various embodiments of the present disclosure, if the screen is covered with the cover for the electronic device, the electronic device may perform the operation of activating the covered area including at least a part of the remaining area of the screen except for the open area and the operation of executing a function corresponding to the user input inputted through the covered area. Upon activation of the open area of the cover, at least a part of the remaining area except for the open area may be activated together.

A result of execution of the function corresponding to the user input may be displayed on the open area.

The operation of activating the covered area may include activating at least one sub-area of the plurality of sub-areas of the covered area. The operation of executing the function corresponding to the user input may include the operation of sensing a user input on the covered area, the operation of detecting a sub-area corresponding to a position at which the user input is generated, and the operation of executing a function corresponding to a combination of the user input and the detected sub-area.

The plurality of sub-areas, a user input corresponding to each of the plurality of sub-areas, and an execution function corresponding to each of the plurality of sub-areas may be designated according to user's selection.

The operation of executing the function corresponding to the user input may include the operation of sensing an input generated within a predetermined time from generation of the user input on the covered area, the operation of detecting the user input and a pattern corresponding to the user input, and executing the function corresponding to the combination of the user input and the pattern.

The operation of executing the function corresponding to the user input may include the operation of sensing the first user input through the covered area, the operation of sensing the second user input through the covered area, the operation of detecting the first user input and the second user input, and the operation of executing the function corresponding to a combination of the first user input and the second user input.

If the first user input is sensed and the second user input is sensed within the predetermined time, the operation may be performed.

The first input and the second input may be at least one of a touch, a hovering input, or a pen input.

Various embodiments of the present disclosure allow the user to input various user gestures and the electronic device to execute corresponding functions when the cover is in a closing state.

Other effects that may be obtained or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

The embodiments of the present disclosure provided in the present specification and the drawings merely provide particular examples to easily describe the technical contents of the present disclosure and to facilitate understanding of the present disclosure, rather than to limit the scope of the embodiments of the present disclosure. Thus, the scope of the embodiments of the present disclosure should be construed as including any changes or modifications derived from the technical spirit of the embodiments of the present disclosure as well as the embodiments described herein.

FIGS. 1-19 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method for executing a function in an electronic device, the method comprising:
   activating a covered area of a touch screen included in the electronic device, when a window area of the touch screen corresponding to a window included in a cover is activated in response to determining that the touch screen is covered with a cover, wherein the covered area of the touch screen is an area except the window of the touch screen in the cover;
   receiving a hovering input approached to the covered area of the touch screen in a predetermined distance, while the covered area of the touch screen is activated; and
   executing a function corresponding to the hovering input.

2. The method of claim 1, wherein the covered area of the touch screen comprising at least a part of the touch screen is activated in response to an open area of the touch screen.

3. The method of claim 1, wherein a result of executing the function is displayed on an open area of the touch screen.

4. The method of claim 1, wherein activating the covered area of the touch screen comprises activating at least one of a plurality of sub areas forming the covered area of the touch screen.

5. The method of claim 4, wherein the executing of the function corresponding to the hovering input comprises:
   detecting a sub area corresponding to a position at which the hovering input is generated; and
   executing a function corresponding to a combination of the hovering input and the detected sub area.

6. The method of claim 5, wherein each of a plurality of sub areas, a user input corresponding to each of the plurality of sub areas, and an execution function corresponding to each of the plurality of sub areas are designated according to user's selection.

7. The method of claim 1, wherein the executing of the function corresponding to the hovering input comprises:
   detecting a pattern of the input, executing a function corresponding to the pattern.

8. The method of claim 1, wherein the executing of the function corresponding to the hovering input comprises:
   sensing a first user input inputted onto the covered area of the touch screen;
   sensing a second user input inputted onto the covered area of the touch screen;
   detecting the first user input and the second user input; and
   executing a function corresponding to a combination of the first user input and the second user input.

9. The method of claim 8, wherein the function is executed only when the second input is detected within a predetermined time of detecting the first input.

10. The method of claim 8, wherein each of the first input and the second input comprises at least one of a touch input, the hovering input, and a pen input.

11. An electronic device comprising:
    a display panel including a touch screen; and
    a controller configured to control operations of:
    activating a covered area of the touch screen when a window area of the touch screen corresponding to a window included in a cover is activated in response to determining that the touch screen is covered with a cover, wherein the covered area of the touch screen is an area except the window of the touch screen in the cover, receiving a hovering input approached to the covered area of the touch screen in a predetermined distance, while the covered area of the touch screen is activated, and executing a function corresponding to the hovering input.

12. The electronic device of claim 11, wherein a result of executing the function is displayed in an open area of the touch screen.

13. The electronic device of claim 11, wherein activating the covered area of the touch screen, at least one of a plurality of sub areas forming the covered area of the touch screen is activated.

14. The electronic device of claim 13, wherein the controller detects a sub area corresponding to a position at which the hovering input is generated, and executes a function corresponding to a combination of the hovering input and the detected sub area.

15. The electronic device of claim 14, wherein the plurality of sub areas, a user input corresponding to each of the plurality of sub areas, and an execution function corresponding to each of the plurality of sub areas are designated according to user's selection.

16. The electronic device of claim 11, wherein the controller detects a pattern of the input, and executes the function corresponding to the pattern.

17. The electronic device of claim 11, wherein if sensing a first user input inputted onto the covered area of the touch screen and sensing a second user input inputted onto the covered area of the touch screen, the controller detects the first user input and the second user input and executes a function corresponding to a combination of the first user input and the second user input.

18. The electronic device of claim 17, wherein the function is executed only when the second input is detected within a predetermined time of detecting the first input.

19. A non-transitory computer-readable recording medium including processor-executable instructions which when executed by a processor cause the processor to perform a process comprising the steps of:
activating a covered area of a touch screen included in an electronic device when a window area of the touch screen corresponding to a window included in a cover is activated in response to determining that the touch screen is covered with a cover, wherein the covered area of the touch screen is an area except the window of the touch screen in the cover;
receiving a hovering input approached to the covered area of the touch screen in a predetermined distance, while the covered area of the touch screen is activated; and
executing a function corresponding to the hovering input.

* * * * *